(12) United States Patent
Takahashi et al.

(10) Patent No.: US 7,755,772 B2
(45) Date of Patent: Jul. 13, 2010

(54) TIRE SHAPE MEASURING SYSTEM

(75) Inventors: Eiji Takahashi, Kobe (JP); Naokazu Sakoda, Kobe (JP); Tsutomu Morimoto, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 190 days.

(21) Appl. No.: 12/219,901

(22) Filed: Jul. 30, 2008

(65) Prior Publication Data

US 2009/0040533 A1 Feb. 12, 2009

(30) Foreign Application Priority Data

| Aug. 6, 2007 | (JP) | ............................... 2007-204266 |
| Aug. 9, 2007 | (JP) | ............................... 2007-208353 |

(51) Int. Cl.
*G01B 11/24* (2006.01)
(52) U.S. Cl. ...................................... 356/601; 356/607
(58) Field of Classification Search ......... 356/601–623; 73/146

See application file for complete search history.

(56) References Cited

U.S. PATENT DOCUMENTS

| 5,054,918 A | * | 10/1991 | Downing et al. ....... 356/139.09 |
| 5,506,683 A | * | 4/1996 | Yang et al. .................. 356/606 |
| 6,124,925 A | | 9/2000 | Kaneko et al. |
| 6,407,817 B1 | | 6/2002 | Norita et al. |
| 7,177,740 B1 | * | 2/2007 | Guangjun et al. ............. 701/34 |
| 7,269,997 B2 | | 9/2007 | Dale, Jr. et al. |
| 2005/0268707 A1 | | 12/2005 | Dale, Jr. et al. |

FOREIGN PATENT DOCUMENTS

| CN | 1997870 A | 4/2005 |
| EP | 0 488 292 A2 | 11/1991 |
| EP | 0 488 292 A3 | 11/1991 |
| EP | 1 197 728 A1 | 4/2001 |
| EP | 1 477 765 A1 | 2/2003 |
| JP | 11-138654 | 11/1997 |

OTHER PUBLICATIONS

Partial European Search Report dated Sep. 22, 2008 regarding European Application No. 08012306.0-1524.
Extended European Search Report dated Nov. 17, 2008 regarding European Patent Application No. 08012306.0-1524.
Office Action from Chinese Patent Office dated Jan. 29, 2010, with English translation.

* cited by examiner

*Primary Examiner*—Hoa Q Pham
(74) *Attorney, Agent, or Firm*—Stites & Harbison, PLLC; Juan Carlos A. Marquez, Esq.

(57) ABSTRACT

A tire shape measuring system measures a surface shape on the basis of an image of a line of light (a light section line) emitted to a surface of a relatively rotating tire using a light-section method. The shape measuring system includes a light projector for emitting a plurality of lines of light onto a tire surface in directions different from a direction in which the height of the surface is detected so as to form a plurality of separate light section lines and a camera for capturing images of the light section lines in directions in which chief rays of the lines of light are specularly reflected by the tire surface. The shape measuring system individually detects the coordinates of the light section lines from images of pre-defined independent image processing target areas for each captured image and calculates the distribution of the surface height using the detected coordinates.

14 Claims, 11 Drawing Sheets

FIG. 8A  BEFORE SHIFT OPERATION IS PERFORMED
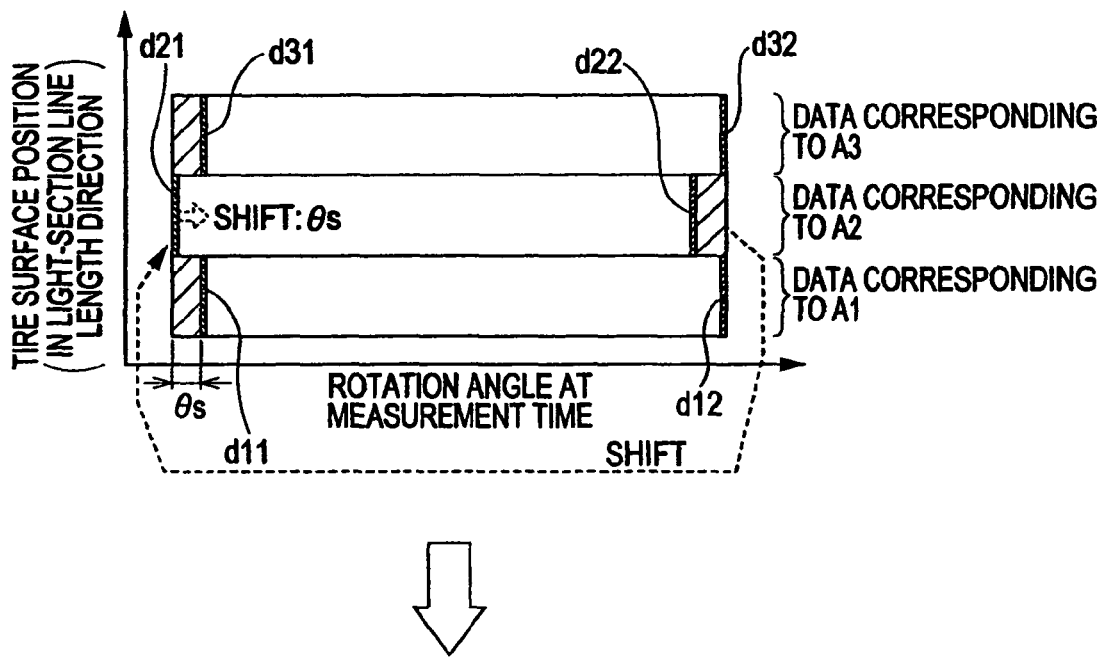
FIG. 8B  AFTER SHIFT OPERATION IS PERFORMED
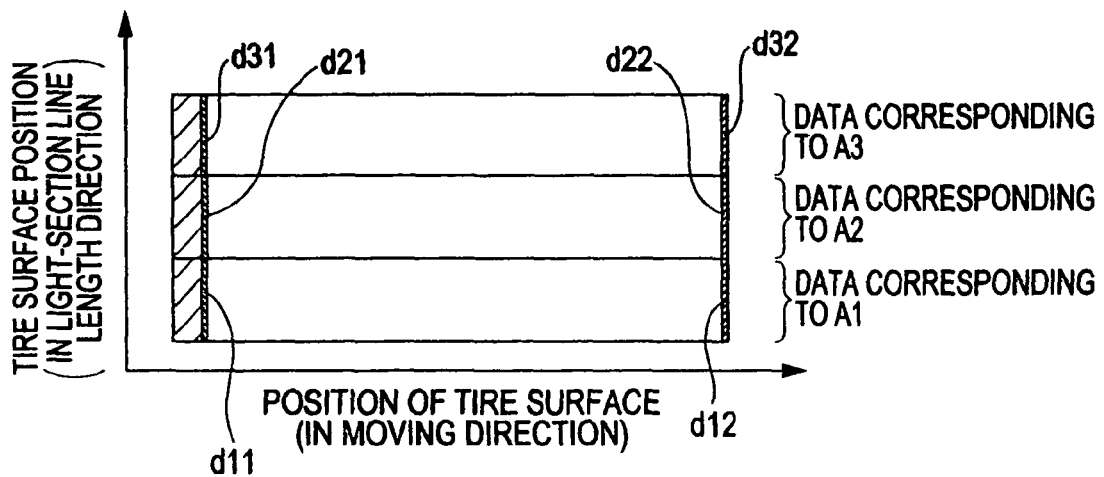

TIRE SHAPE MEASURING SYSTEM

CROSS REFERENCES TO RELATED APPLICATIONS

The present invention contains subject matter related to Japanese Patent Application No. 2007-204266 filed in the Japanese Patent Office on Aug. 6, 2007 and No. 2007-208353 filed in the Japanese Patent Office on Aug. 9, 2007, the entire contents of which are incorporated herein by reference.

BACKGROUND OF THE INVENTION

1. Field of the Invention

The present invention relates to a tire shape measuring system for capturing an image of a line of light (an image of a light-section line) emitted to the surface of a relatively rotating tire and detecting the surface shape of the tire by detecting the shape using the captured image and a light-section method.

2. Description of the Related Art

In general, in order to control the quality of products in factories, the surface shape of a product (the distribution of the height of the surface of a product) needs to be contactlessly measured at high speed.

Tires are manufactured by laminating a variety of materials, such as rubber, chemical fabrics, and steel cords. If the laminated structure has a non-uniform portion and the tire is filled with air, a protrusion called a "bulge" or a recess portion called a "dent" or a "depression" is generated in a portion having a relatively weak resistance to pressure. After being inspected, such defective tires having a bulge or a dent should not be shipped for a safety reason or an appearance reason.

In existing inspection methods for detecting a defective tire shape, the surface heights of a plurality of points of a tire are measured using a contact or non-contact point-measuring sensor while the tire is being rotated by a rotator. Subsequently, the surface shape of the tire is measured using the distribution of the surface heights. However, in the inspection method for detecting a defective tire shape on the basis of measurement of the tire shape using a point-measuring sensor, the number of the sensors arranged and the time available for inspection are limited. Accordingly, the entire surface shape of the tire to be measured cannot be measured at one time, and therefore, some defective tires may pass through the inspection process.

In contrast, Japanese Unexamined Patent Application Publication No. 11-138654 describes a technology in which slit light (a line of light) is emitted to the surface of a rotating tire, and the image of the slit light is captured. The surface shape of the tire is measured by detecting the shape using a light-section method using the captured image. This technology allows the entire shape of the surface (the sidewall surface or a tread surface to be totally (continuously) measured. Thus, failure to detect a tire having a defective shape can be prevented.

As described in Japanese Unexamined Patent Application Publication No. 11-138654, in general, in order to detect a shape using a light-section method, a line of light is emitted to the surface to be detected (e.g., the sidewall surface of a tire) so that a light-section line (a linear portion to which the light is emitted) is formed in a direction in which the height of the line light is detected (the height direction a surface to be detected). Thereafter, diffusely reflected light of the line of light is captured by a camera disposed in a particular direction so that the linear image of the line of light (the image of the light-section line) is captured.

In general, the surface of a tire and, in particular, the sidewall surface of the tire is black and glossy. Thus, the possibility of a line of light emitted to the surface of the tire being diffusely reflected is relatively low. In addition, the entire surface of a tire and, in particular, the entire sidewall surface of the tire has a convex shape. Accordingly, in order to obtain a desired depth of field, the aperture of the camera should be sufficiently small.

Accordingly, in the measurement process of a surface shape described in Japanese Unexamined Patent Application Publication No. 11-138654, in order to obtain a clear image of the line light, the intensity (light amount) of the line light needs to be increased or the capture rate (the shutter speed) of the camera needs to be decreased so that the exposure time is increased.

However, if the intensity of the line of light is increased, the black tire that easily absorbs the light may be damaged by heat. Furthermore, if a high-power light source (typically, a laser light source) is used, a cooling unit is required. Accordingly, a measuring system is increased in size and cost. Still furthermore, the maintainability disadvantageously decreases.

In addition, in order to capture the image of a light section line in a circumferential direction of the rotating tire with sufficient spatial resolution within a limited time allowable for product inspection, the capture rate (the number of image captures per unit time) cannot be decreased to that sufficient for capturing a clear image of the line of light.

For example, the time allowable for inspecting a defective shape of a tire is 1 second per tire. In addition, in order to distinguish the image of a light section line from a letter printed on the surface of the tire using a light-section method during tire shape measurement, the image needs to be captured with a spatial resolution smaller than or equal to the line width (about 1 mm) of the letter in the circumferential direction of the rotating tire. In order to satisfy the conditions about the inspection time and the spatial resolution, 2000 frames needs to be captured per second for a tire of a passenger vehicle, and 4000 frames needs to be captured per second for a tire of a truck or a bus that is larger than that of a passenger vehicle. Recently, the speed of an image capturing process of an image sensor has been increased. For example, a high-speed image sensor, such as a complementary metal-oxide semiconductor (CMOS) sensor, can capture images as fast as 2000 to 4000 frames per second. However, if images are captured at a high rate of 4000 frames per second, it is difficult to obtain a clear image of the light line using a technology described in Japanese Unexamined Patent Application Publication No. 11-138654.

In addition, during measurement of a tire shape using a light-section method, a process for extracting an image of a light section line (the image of a line of light) from each of the captured images (a one-frame image) is needed. That is, an imaging process for detecting the position (the coordinates) of a light section line having high luminance needs to be performed on the basis of the luminance information about each of pixels of the captured image so that the surface shape (the height of the surface) of the tire is determined using the extracted image of the light section line (i.e., the coordinates of the extracted image). In general, a light section line is extracted by identifying the position (the x coordinate) of a pixel having the highest luminance in a pixel group of each of the horizontal lines of the captured image (for each of positions of the y coordinate). In the sub-processes based on the captured image (the luminance information of each of the pixels of the captured image) of the inspection process for detecting a defective shape of a tire, the extraction sub-process of a light section line makes up almost all of the processing load. In Japanese Unexamined Patent Application Publication No. 11-138654, the extraction sub-process of a light section line is performed by a microcomputer (a micro processing unit (MPU)) including a central processing unit (CPU), a read only memory (ROM), and a random access memory (RAM).

Recently, there has been a growing need to obtain the result of detection of a defective shape substantially in real time because of improved processing time of a process of capturing an image of a tire surface (e.g., 1 second) in the inspection process for detecting a defective shape of a tire.

However, because of a limitation of the processing power of a practical MPU that can be used as a component of an inspection system (a measuring system) for detecting a tire having a defective shape, it is difficult for the MPU to perform the extraction process of a light section line on the basis of a captured image within $1/2000$ to $1/4000$ seconds after the image (the luminance information about an image for one frame) is captured. Accordingly, in the existing inspection process for detecting a defective shaped tire, information about the image captured by an image sensor needs to be stored in a large-capacity memory (e.g., a hard disk). Even after an image capturing process is completed, the extraction process of the light section line on the basis of the captured image (the imaging process performed by the MPU) needs to be performed. As a result, the production efficiency of a tire is decreased.

SUMMARY OF THE INVENTION

Accordingly, it is an object of the present invention to provide a tire shape measuring system capable of, when measuring the shape of a tire surface by capturing an image of a line of light (an image of a light section line) emitted to the surface of the relatively rotating tire and detecting the shape using the captured image and a light-section method, acquiring a clear image of a light section line without increasing the intensity of line light even when the image of the light section line is captured at a sufficiently high rate (e.g., 4000 frames or more per second). It is a further object of the present invention to provide a tire shape measuring system capable of reducing processing load of image processing required for detecting the light section line so as to support such a high image capture rate.

It is a still further object of the present invention to provide a tire shape measuring system including a light section line extracting apparatus capable of receiving, from an image sensor (e.g., a CMOS sensor) that can capture images at a high image capture rate (e.g., 2000 to 4000 frames per second), information (luminance information) about the captured image containing the image of a line of light emitted onto a tire surface and performing a light section line extracting process at high speed on the basis of the received information using a practical device (a circuit), such as an ASIC and an FPGA.

To achieve the above-described objects, according to the present invention, a tire shape measuring system captures an image of a line of light (an image of a light section line) emitted to a surface of a relatively rotating tire and measures the shape of the tire surface by detecting the shape using a light-section method on the basis of the captured image. The tire shape measuring system includes the following components (1-1) to (1-4):

(1-1) line light emitting means for generating a plurality of separate light section lines on the tire surface by emitting a plurality of lines of light in a direction different from a direction in which the height of the tire surface is detected, where each of the light section lines extends in a second direction perpendicular to a first direction representing a moving direction of the tire surface, and areas occupied by the light section lines are shifted with respect to each other in the second direction (i.e., the center positions thereof in the second direction are different);

(1-2) image capturing means for capturing images of the separate light section lines formed on the tire surface in directions in which chief rays of the lines of light are specularly reflected by the tire surface;

(1-3) light section line coordinate detecting means for individually detecting the coordinates of the light section lines representing the coordinates of the images of the light section lines from images of independent image processing target areas pre-defined for the separate light section lines in a coordinate system of a captured image captured by the image capturing means for each of a plurality of captured images captured by the image capturing means in accordance with a predetermined amount of rotational movement; and (1-4) surface shape calculating means for calculating a distribution of the surface heights of the tire in the first direction on the basis of the plurality of coordinates of the light section lines detected by the light section line coordinate detecting means.

As used herein, the term "surface of a relatively rotating tire" refers to a surface of a tire in the case where the tire is rotating about the rotation axis thereof or in the case where the tire is stationary while an optical system used for emitting a line of light and capturing the image of the line of light is rotating in the shape measuring system.

When a line of light is emitted to the black and glossy surface of a tire, a light amount of specularly reflected light is larger than that of diffusely reflected light traveling in a particular direction (in a direction of the image capturing range of the camera). In addition, the surface of a tire is curved. Accordingly, even when the image capturing means captures the image of a long line of light (the image of a light section line) in a direction in which the chief ray (the ray traveling along the center line) of the line of light is specularly reflected, specularly reflected light rays output from either end portion of the light line, which is remote from the chief ray, does not reach the image capturing means. Therefore, portions of the image remote from the center of the image of the light section line are not clear due to an insufficient amount of the reflected light reaching the image capturing means.

In contrast, according to the present invention, since the image capturing means of the tire shape measuring unit captures an image of a light section line (an image of a line of light) in a direction in which the line of light emitted to the tire surface is specularly reflected, a clear image of the light section line can be obtained without increasing the intensity of the line of light even when the image capture is performed at a sufficiently high image capture rate (e.g., 4000 frames or more per second). In addition, the line light emitting means emits a plurality of short lines of light onto the tire surface with areas occupied by the lines of light being shifted with respect to each other in the length direction thereof (the second direction). Furthermore, the image capturing means is located in a direction in which the chief rays of the lines of light are specularly reflected. Therefore, according to the present invention, clear images of all of the light section lines located in a relatively wide area in the second direction can be obtained.

In addition, according to the present invention, a plurality of light section lines are separately formed on the tire surface.

Accordingly, by determining the distances between the neighboring light section lines sufficient for the changes in the positions of the light section lines caused by a change in the surface shape of the tire, a plurality of independent image processing target areas corresponding to the light section lines can be pre-defined in the coordinate system of a captured image. As used herein, the term "independent image processing target areas corresponding to the light section lines" refers to areas where each of the images of the areas contains only the image of a light section line which has a one-to-one correspondence with the area, and contains no other light section lines.

Note that the independent image processing target areas corresponding to the separate light section lines can be computed by, for example, pre-measuring an object for correction having a known shape using the tire shape measuring system (by capturing the image of the object using the image capturing means) and using the positions (the coordinates) of the images of the light section lines in the captured image.

Alternatively, when a plurality of lines of light are emitted to a tire surface, the lines of light may be continuously emitted so that one light section line is formed on the tire surface. In such a case, the surface shape of the tire can be measured simply by performing image processing on the image of the single light section line using the existing light-section method.

However, in order to position the coordinate systems of the plurality of lines of light so that one light section line is formed on the tire surface, highly accurate positioning control is needed. As a result, the operation of positioning and the required time decreases the inspection efficiency.

FIG. 10 is a schematic illustration of a positional shift between light section lines v1 to v3 occurring when the light section lines v1 to v3 are continuously arranged on the tire surface so as to form one light section line. Note that, although three light section lines (three lines of light emitted to the tire surface) are shown in FIG. 10, two light section lines or four or more light section lines may be formed.

As shown in FIG. 10, if a positional shift between the light section lines v1 to v3 occurs, the positions (the coordinates) of the images of the light section lines cannot be properly detected by using a simple process (an existing process) in which the position of a pixel having the highest luminance is detected for each line in a direction perpendicular to the length direction of the light section lines (i.e., the X-axis direction shown in FIG. 10).

Furthermore, if slight positional shift between the positions of the light section lines v1 to v3 formed on the tire surface is allowed, and a coordinate detecting process (image processing) of the light section lines that permits the positional shift is performed, the processing load becomes high. Accordingly, a practical (relatively low-cost) circuit or processor may not be used for high-speed image processing performed in synchronization with a high image capture rate (e.g., 4000 frames or more per second).

In contrast, according to the present invention, the light section line coordinate detecting means detects the coordinates of each of the images of the separate light section lines from the images of the independent image processing target areas. Accordingly, the coordinates of each of the images of the light section lines can be detected through the simple process (the high-speed process) in which the position of a pixel having the highest luminance is detected for each line. That is, even when the image of a light section line is captured at a high image capture rate, a clear image of a line of light emitted to a tire surface can be obtained. In addition, the processing load of image processing required for detecting the light section line at such a high image capture rate can be reduced.

Furthermore, according to the present invention, by arranging the surface heights of the tire computed using a plurality of the coordinates of the light section lines detected in accordance with a predetermined unit of rotation (e.g., at predetermined angular intervals of rotation of the tire) for each locations (the coordinates) in the second direction, the distribution of the height in the first direction can be obtained. Accordingly, the surface shape calculating means can compute the distribution of the height at least in the first direction.

In a tire surface inspection process, when only acquisition of a one-dimensional profile in the X-axis direction (the moving direction of the tire surface) at each of the positions in the Y-axis direction is sufficient, the calculation result of the surface shape calculating means can be used.

In addition, the tire surface measuring system according to the present invention may include a plurality of sets of the line light emitting means and the image capturing means, and each of the sets can emit the lines of light and capture the image of the light section lines for one of a plurality of surfaces of the tire at the same time.

In this way, the shapes of a plurality of surfaces of the tire (e.g., the sidewall surfaces and the tread surface) can be measured at the same time, and therefore, the time required for measuring all of the target tire surfaces can be reduced.

At that time, it is desirable that the plurality of line light emitting means corresponding to the plurality of surfaces of the tire emit the lines of light having different wavelengths.

For example, predetermined image processing means may extract images having specific wavelengths (colors) from the captured images output from the image capturing means as the images of lines of light. Alternatively, the shape measuring system may include optical filters that selectively pass light having the corresponding wavelengths, and the optical filters may be disposed in the optical paths of light made incident on the image capturing means.

In this way, when the shape of one of the surfaces of the tire is measured, the line of light used for measuring the shape of another surface does not interfere with the measurement as noise light.

In addition, it is more desirable that the tire shape measuring system further includes either one of the following components (1-5) and (1-6):

(1-5) collimating means for collimating each of the lines of light emitted to the tire surfaces by the line light emitting means; and (1-6) light converging means for converging each of the lines of light emitted to the tire surfaces by the line light emitting means in a light line length direction.

In this way, even when the length of each of the lines of light emitted to the curved tire surface is slightly increased, the direction in which rays remote from the chief ray towards either end of the light line are specularly reflected can be made close to the direction towards the image capturing means. As a result, the number of lines of light can be reduced, and therefore, the configuration of the system can be simplified.

Furthermore, in the tire shape measuring system according to the present invention, the line light emitting means may form the plurality of separate light section lines each extending in the second direction (i.e., the length direction of the light section lines) on the tire surface so that an end of any one of the separate light section lines overlaps with an end of the neighboring light section line in the second direction.

In this way, the measurement data of the shape of the tire surface (the distribution of the height) in the second direction can be obtained without any loss (i.e., continuously).

Still furthermore, in the tire shape measuring system according to the present invention, the light section line coordinate detecting means can detect the coordinates of the light section line by detecting the coordinate of a pixel having the highest luminance on a line-to-line basis in the first direction for each of the images of the independent image processing target areas.

In this way, the coordinates of the light section line can be detected through simple processing with low processing load.

If a variation (an individual difference) in the tire surface shape (the height of the tire surface) is small relative to the distance between neighboring pairs among the plurality of light section lines, no problem occurs even when the coordinates of the image processing target areas corresponding to the light section lines are fixed. However, if the variation in the tire surface shape is large and the coordinates of the image processing target areas are fixed, the positions of the light section lines are shifted beyond the corresponding image processing target areas (hereinafter referred to as an "out-of-area state"). Thus, the coordinates of the light section lines may not be properly detected. However, in general, the surface shape of a tire tends to gradually change. Accordingly, even when the surface shape of a tire markedly changes, a variation in the positional relationship among the light section lines remains within a small variation range. In contrast, the total position of the light section lines (in particular, the position in the first direction) significantly changes.

Therefore, it is desirable that the shape measuring system according to the present invention further includes the following component (1-7):

(1-7) automatic image processing target area setting means for automatically setting the coordinates of the independent image processing target areas by detecting a position of a pixel having a luminance higher than or equal to a predetermined level in at least one of predetermined areas of the image captured by the image capturing means and shifting the coordinates of a plurality of pre-defined independent reference areas in accordance with the detected position of the pixel.

In this way, the occurrence of the out-of-area state can be prevented by presetting the coordinates of the independent reference areas corresponding to predetermined reference heights of the tire surface, detecting a position of a pixel having a luminance higher than or equal to a predetermined level (i.e., a position of part of a specific light section line) in the image of an area which only the specific one of the light section lines (i.e., the pre-defined area) always passes through, and shifting the coordinates of the pre-defined independent reference areas (in particular, the coordinate in the first direction) in accordance with the detected position of the pixel.

According to the present invention, since a plurality of separate light section lines are formed on a tire surface, the surface shapes (the distribution of the height in the second direction (a one-dimensional profile)) of the tire computed from the plurality of light section lines appear in a captured image at different positions in the first direction (i.e., positions shifted by a predetermined moving amount in the first direction). Accordingly, if the two-dimensional profile (in the first and second directions) of the tire surface is needed in order to inspect the shape of the tire surface, the tire shape measuring system according to the present invention may have the following structure (1-8):

(1-8) a structure in which the surface shape calculating means calculates distributions of the surface heights of the object to be measured in the first and second directions on the basis of the plurality of coordinates of the light section line's detected by the light section line coordinate detecting means and predetermined setting shift information about shift amounts of the movement corresponding to positional shifts among the separate light section lines in the first direction.

The shift amounts of the movement can be computed by, for example, pre-measuring an object for correction having a known shape using the tire shape measuring system (capturing the image of the object using the image capturing means) and performing image processing on the basis of the obtained captured image.

In addition, as described above, in order to measure the shape of the sidewall surface of the tire having letters printed thereon, the letters needs to be distinguished from the image of a line of light. Therefore, high spatial resolution needs to be provided by capturing the image at a high image capture rate. The present invention can be suitably applied to measurement of such an object.

Accordingly, it is desirable that the shape measuring system of the present invention has the following structure. That is, the line light emitting means may include first line light emitting means for forming, on a sidewall surface of the tire, the plurality of separate light section lines each extending in the second direction substantially parallel to a radial direction of the tire. In addition, the image capturing means may include first image capturing means for capturing images of the plurality of separate light section lines formed on the sidewall surface of the tire by the first line light emitting means.

In this way, the shape of the sidewall surface of the tire can be detected at high speed and with high spatial resolution.

Alternatively, the shape measuring system according to the present invention may have the following structure.

That is, the line light emitting means may include second line light emitting means for forming, on a tread surface of the tire, the plurality of separate light section lines each extending in the second direction substantially parallel to a direction perpendicular to the circumferential direction of the tire. In addition, the image capturing means may include second image capturing means for capturing images of the plurality of separate light section lines formed on the tread surface of the tire by the second line light emitting means.

Still furthermore, to achieve the above-described objects, according to the present invention, a tire shape measuring system captures an image of a line of light emitted to a surface of a relatively rotating tire and measures the shape of the tire surface by detecting the shape using a light-section method on the basis of the captured image. The tire shape measuring system includes line light emitting means for emitting a plurality of continuous lines of light in a direction different from a direction in which the height of the tire surface is detected so as to form one light section line on the tire surface, image capturing means for capturing images of the lines of light emitted to the tire surface in directions in which chief rays of the lines of light are specularly reflected by the tire surface, and a light section line extracting apparatus for receiving luminance information about pixels of an image captured by an image sensor of the image capturing means that captures a two-dimensional image including an image of light section line formed on the tire surface and extracting the image of the light section line on the basis of the received luminance information. The light section line extracting apparatus includes the following components (2-1) to (2-6):

(2-1) information input means for receiving luminance information about a pixel block that is one of pixel groups formed by separating pixels in one horizontal line of the image captured by the image sensor into the pixel groups in parallel and storing, in predetermined storage means, the luminance information about the received pixel block and coordinate information about the pixels in the pixel block in synchronization with a clock signal of a predetermined frequency;

(2-2) a plurality of first luminance comparing means disposed downstream of the information input means in a multi-stage fashion for comparing every neighboring two of all pieces of the luminance information stored by the first luminance comparing means in the immediately preceding stage with each other and storing the piece of the luminance information having the higher luminance and the coordinate information about the pixel in a predetermined storage means in synchronization with the clock signal;

(2-3) second luminance comparing means for comparing luminance information stored by the first luminance comparing means in the last stage that stores the luminance information having the highest luminance among the pieces of the luminance information of the pixel block with the previously stored luminance information as a result of previous processing and storing the piece of the luminance information having the higher luminance and the coordinate information about the pixel in a predetermined storage means in synchronization with the clock signal;

(2-4) horizontal synchronization signal generating means for generating a horizontal synchronization signal representing a timing of the luminance information about a pixel having the highest luminance in each of the pixel groups of one horizontal line of the captured image being stored in predetermined storage means by the second luminance comparing means;

(2-5) information recording means for sequentially writing, in an append mode, the luminance information and the coordinate information about the pixel stored by the second luminance comparing means to predetermined light section line information storage means in synchronization with the horizontal synchronization signal; and (2-6) luminance initializing means for initializing the luminance information stored by the second luminance comparing means in synchronization with the horizontal synchronization signal.

As used herein, the term "surface of a relatively rotating tire" refers to a surface of a tire in the case where the tire is rotating about the rotation axis thereof or in the case where the tire is stationary while an optical system used for emitting a line of light and capturing the image of the line of light is rotating in the shape measuring system.

An ultra high-speed image sensor, such as a CMOS sensor, has a function of parallel outputting, in synchronization with a high-frequency (e.g., 20 to 40 MHz) clock signal, the luminance information about pixel groups (the above-described pixel blocks) that are generated by separating the pixel group for one horizontal line (a line in the X-axis direction) of a captured image of one frame into a plurality of pixel groups.

Upon receiving all the information (luminance information) about the captured image of one frame, the light section line extracting apparatus does not perform the light section line extracting process on the basis of the information, but receives the luminance information about the pixel blocks, which are part of the captured image, in parallel in synchronization with the high frequency clock signal. Subsequently, the light section line extracting apparatus separates a process of extracting the highest luminance information from that luminance information into unit processes with small processing load (i.e., processes performed by the first luminance comparing means and the second luminance comparing means) and performs the unit processes arranged in a multi-stage fashion. Subsequently, the light section-line extracting apparatus stores information about the light section lines (the highest luminance information for each of the horizontal lines and the coordinates of the highest luminance information) in the predetermined storage means.

In this way, the light section line extracting apparatus can perform the light section line extraction process in real time for the image capture rate of the image sensor, although a slight delay occurs for the one-frame image capturing completion timing of the image sensor. In addition, since the computing load of the unit process to be performed in synchronization with the clock signal can be reduced, the light section line extracting apparatus can be achieved using a practical device (a circuit), such as an ASIC or an FPGA.

Furthermore, the information about the light section lines extracted from the captured image of one frame is stored in the predetermined storage means. Accordingly, if a computer that performs a shape measuring process using a light-section method sequentially acquires the stored information, the computer can measure the shape of the tire surface (the distribution of the height of the tire surface).

In addition, the processes of the luminance information for a set of pixel blocks performed by the information input means and the first luminance comparing means in a first stage may be performed in two cycles of the clock signal or may be continuously performed in one cycle of the clock signal.

For example, assume that a captured image has a resolution of 320 by 256, 256 pixels of one horizontal line is separated into 16 blocks (16 pixel groups), and the image sensor outputs the luminance information (16 pieces of luminance information) in parallel in synchronization with a clock signal of 20.5 MHz or higher. At that time, if the light section line extracting apparatus performs processing in synchronization with the clock signal of 20.5 MHz, the light section line extracting apparatus can perform the light section line extracting process in real time for the image capture rate of 4000 frames per second. The practical devices (circuits), such as widely used ASICs and FPGAs, can operate in synchronization with a clock signal of about 20.5 MHz or higher (e.g., about 40 MHz) without any problem.

Note that, in the above-described example, a delay of several clocks occurs from when the image sensor completes the image capturing process (the image sensor starts outputting the luminance information about the last pixel block of the image of one frame) to when recording of the information about the light section lines in the captured image is completed. For example, assume that 1 clock of the clock signal is needed for inputting the luminance information about the last pixel block, 4 clocks are needed for identifying the highest luminance information from among 16 pieces of the luminance information for the pixel block (the process performed by the first luminance comparing means), 1 clock is needed for determining the highest luminance information from among the luminance information for the last one line (16 pixel blocks) of the captured image (the process performed by the second luminance comparing means for the image of the last one line), and 1 clock is needed for the process performed by the information recording means. Then, a delay of 7 clocks (the sum of these clocks) occurs.

In addition, the light section line extracting apparatus may further include the following component (2-7):

(2-7) information transfer means for transferring the information written to the predetermined light section line information storage means by the information recording means to the outside in synchronization with a detection signal output from rotation detecting means (e.g., a rotary encoder disposed on a rotation shaft of the rotating tire) for detecting a predetermined amount of rotation (advance of rotation by the predetermined amount).

In this way, the detection signal output from the rotation detecting means functions as a vertical synchronization signal of the captured image. In synchronization with the vertical synchronization signal, information about the light section line extracted from an image of one frame is transferred to an apparatus, such as a computer, for performing the shape measuring process using a light-section method. As a result, the shape (the distribution of the height) of a tire surface in the moving direction can be measured.

According to the present invention, a tire shape measuring system can be provided that is capable of, when measuring the shape of a tire surface by capturing an image of a line of light (an image of a light-section line) emitted to the surface of the relatively rotating tire and detecting the shape using the captured image and a light-section method, acquiring a clear image of a light section line without increasing the intensity of line light even when the image of the light section line is captured at a sufficiently high rate (e.g., 4000 frames or more per second). As a result, the tire shape measuring system can detect the surface shape of a tire at high speed and with a high spatial resolution without thermally damaging the tire.

Furthermore, according to the present invention, the tire shape measuring system detects the coordinates of each of the images of the separate light section lines from the corresponding one of independent image processing target areas. Therefore, the tire shape measuring system can detect the coordinates of each of the images of the separate light section lines by using a simple (high-speed) process in which, for example, the position of a pixel having the highest luminance is detected on a line-to-line basis. As a result, the processing load of image processing required for detecting the light section line at high image capture rate can be reduced.

Still furthermore, according to the present invention, a tire shape measuring system can be provided that can receive, from an image sensor (e.g., a CMOS sensor) that can capture images at a high image capture rate (e.g., 2000 to 4000 frames per second), information (luminance information) about the captured image containing the image of a line of light emitted onto a tire surface and perform a light section line extracting process at high speed (in real time) on the basis of the received information using a practical device (a circuit), such as an ASIC and an FPGA.

BRIEF DESCRIPTION OF THE DRAWINGS

FIGS. 8A and 8B are schematic illustrations of distribution of measured data acquired by the shape measuring system and shift of the data;

DESCRIPTION OF THE PREFERRED EMBODIMENTS

Exemplary embodiments of the present invention are described below with reference to the accompanying drawings. It is to be understood that following embodiments are only for illustration purposes, which shall not be construed as limitation to the scope of the present invention. Similar numbering will be used in describing similar or equivalent components in the following embodiments.

(1)

Figure 1:
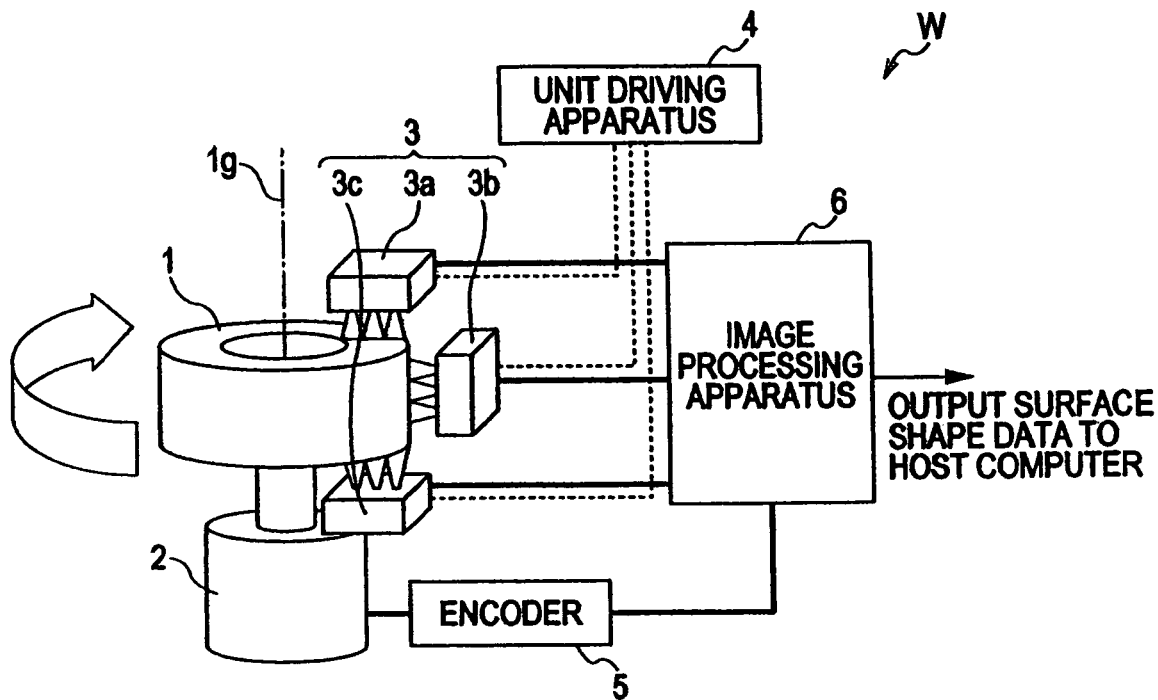
FIG. 1 is a schematic illustration of an exemplary structure of a shape measuring system according to an embodiment of the present invention.
Figure 2:
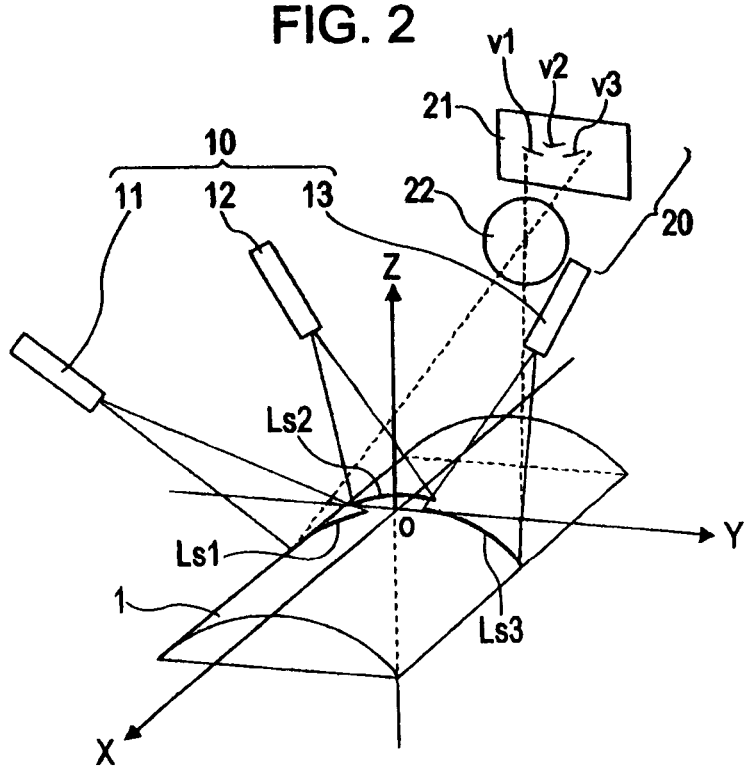
FIG. 2 is a three-dimensional schematic illustration of an arrangement of a light source and a camera in a sensor unit included in the shape measuring system.
Figure 3A:
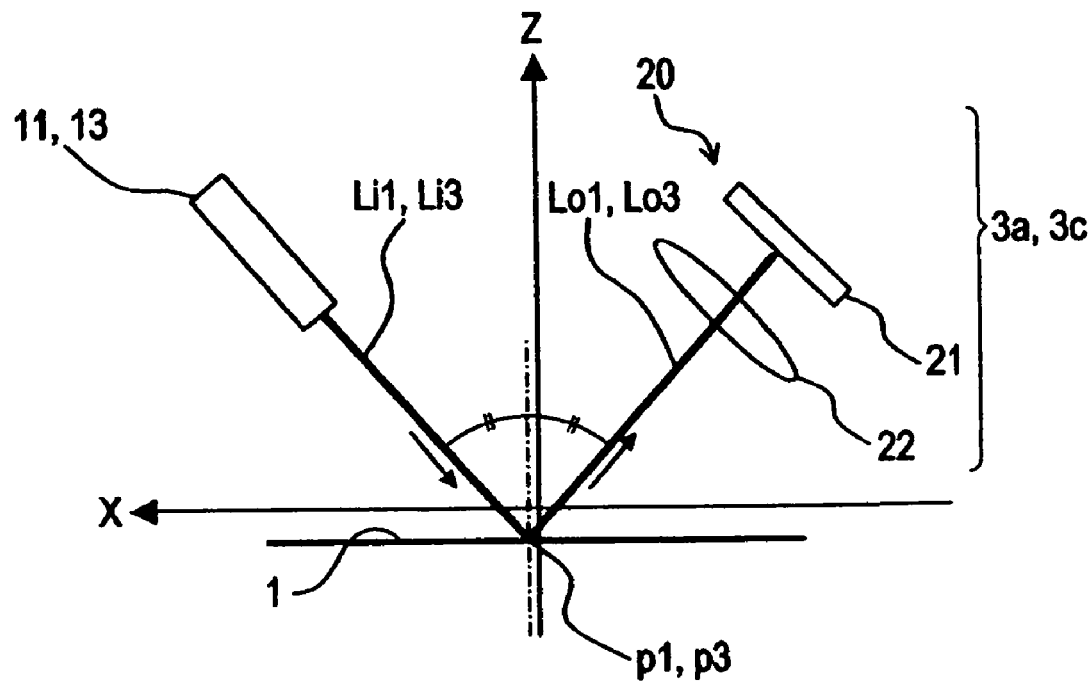
FIGS. 3A and 3B are schematic illustrations of an arrangement of a line light source and a camera in the sensor unit when viewed in a particular direction (a Y-axis direction)
Figure 3B:
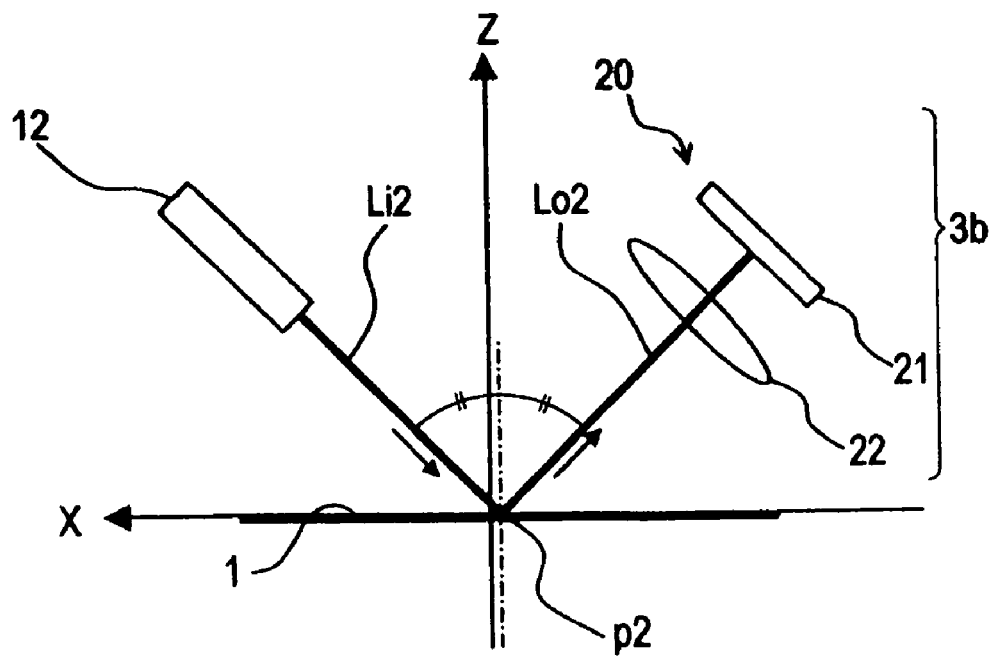
Figure 4A:
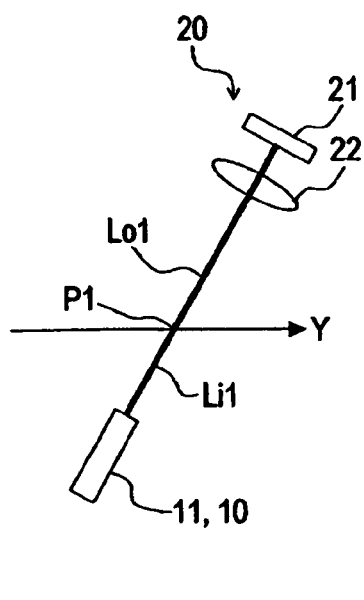
FIGS. 4A to 4C are schematic illustrations of an arrangement of the line light source and the camera in the sensor unit when viewed from a direction perpendicular to a portion of a tire surface located at a position which a chief ray of a line light ray reaches.
Figure 4B:
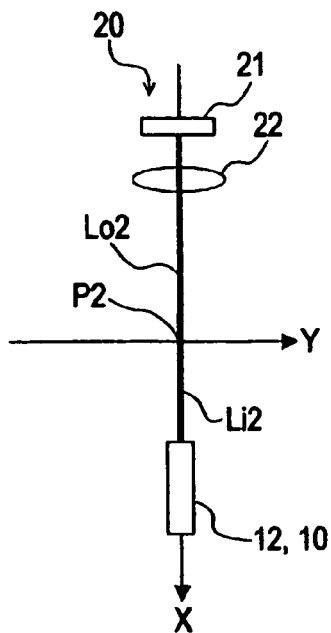
Figure 4C:
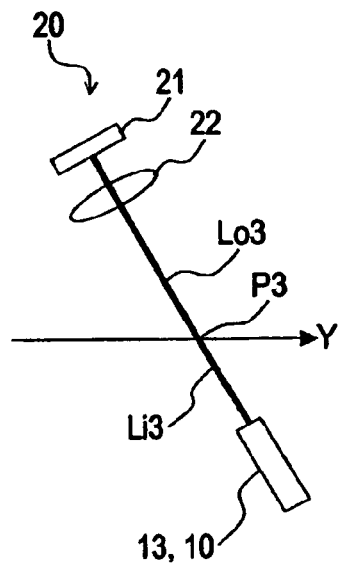
Figure 5:
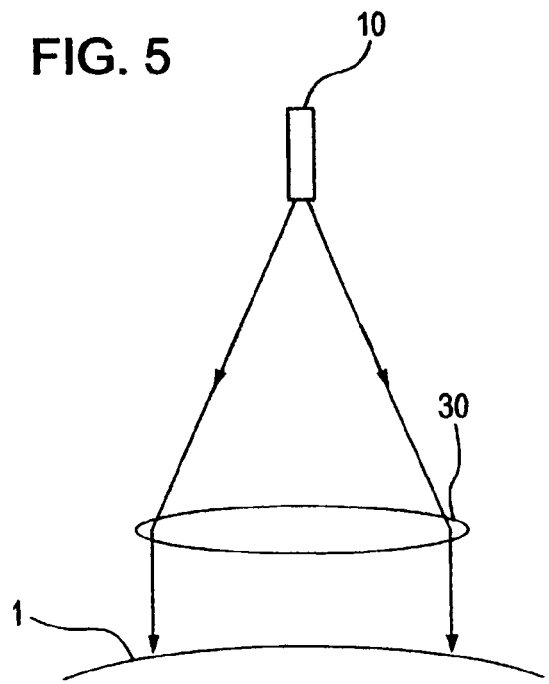
FIG. 5 is a schematic illustration of collimation of a line light ray in the sensor unit.
Figure 6:
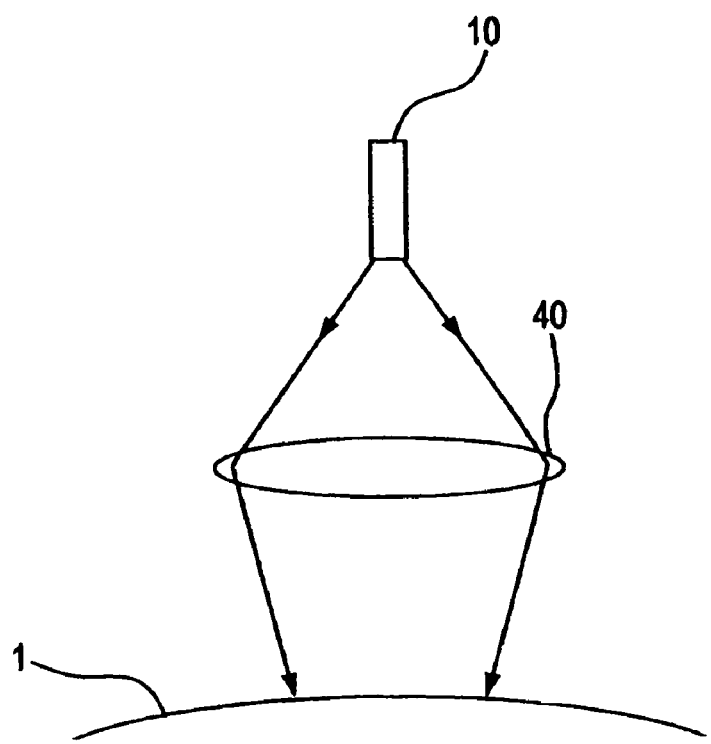
FIG. 6 is a schematic illustration of collection of a line light ray in the sensor unit.
Figure 7:
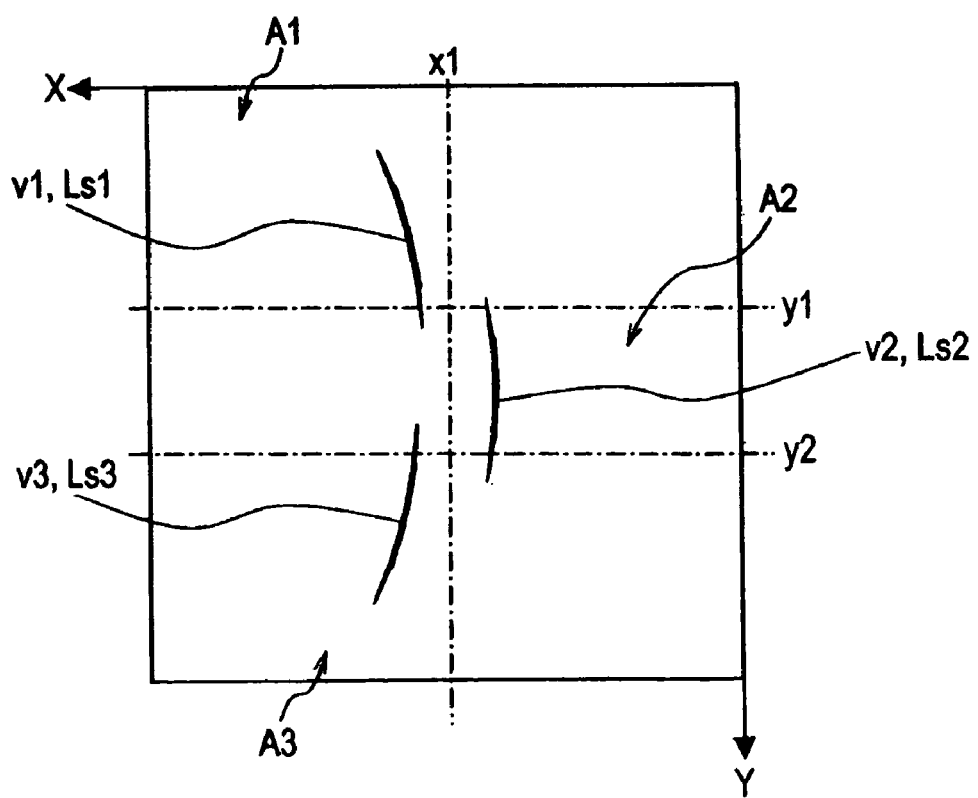
FIG. 7 is a schematic illustration of an example image of a tire captured by the camera in the shape measuring system.
Figure 9:
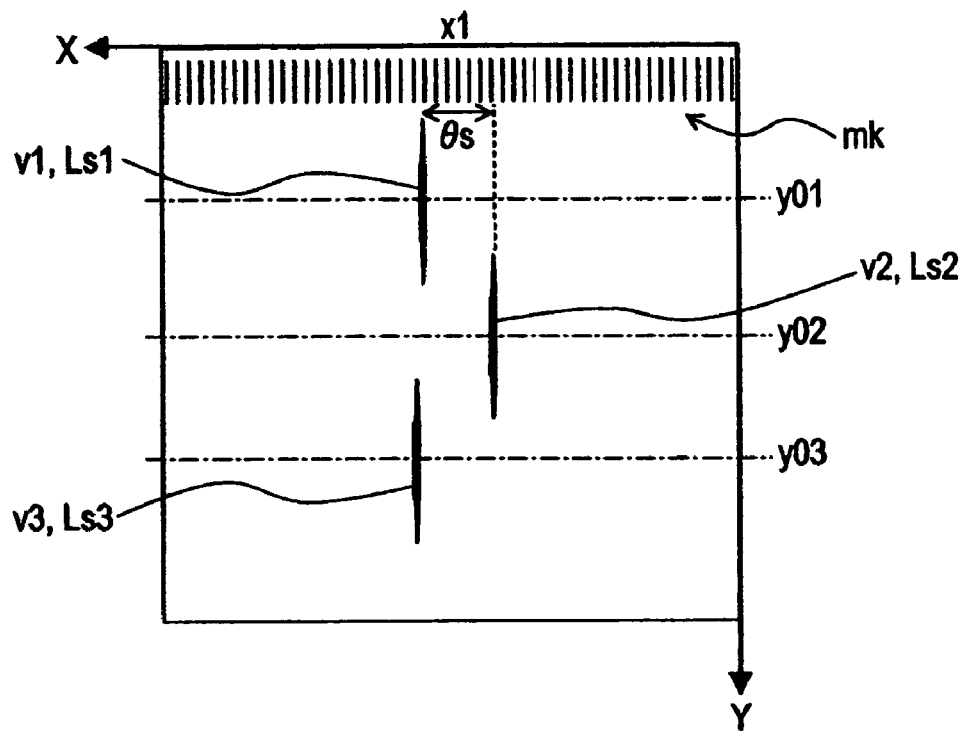
FIG. 9 is a schematic illustration of an example image of a tire for correction captured by the camera in the shape measuring system.
Figure 10:
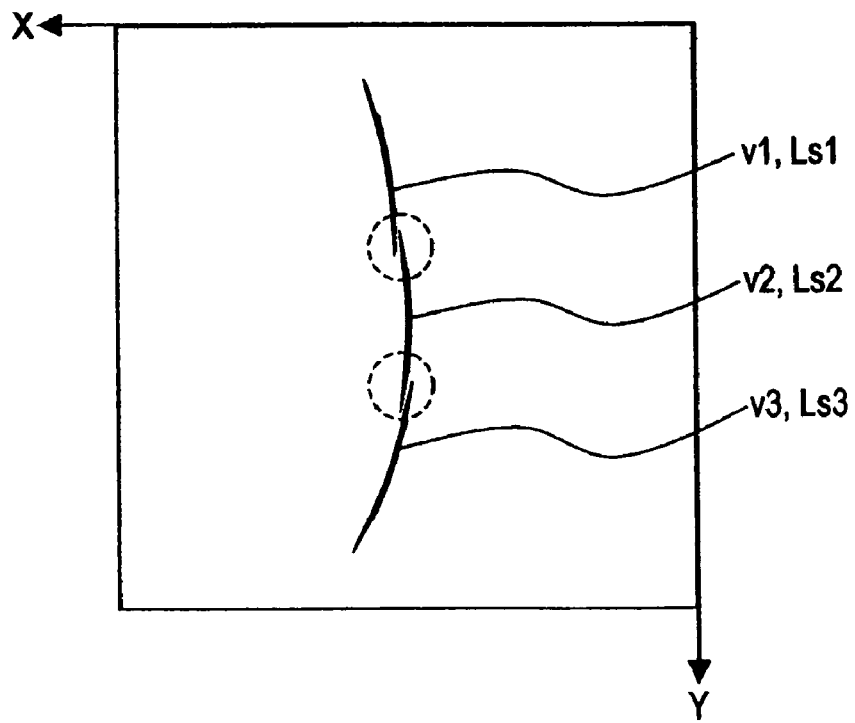
FIG. 10 is a schematic illustration of a positional shift between light section lines occurring when one light section line is generated from a plurality of continuous light section lines formed on a tire surface.

FIG. 1 is a schematic illustration of an exemplary structure of a shape measuring system W for a tire according to an embodiment of the present invention. FIG. 2 is a three-dimensional schematic illustration of an arrangement of a light source and a camera in a sensor unit included in the shape measuring system W. FIGS. 3A and 3B are schematic illustrations of an arrangement of a line light source and a camera in a sensor unit included in the tire shape measuring system when viewed in a particular direction (a Y-axis direction). FIGS. 4A to 4C are schematic illustrations of an arrangement of the line light source and the camera in the sensor unit when viewed from a direction perpendicular to a portion of a tire surface located at a position which a chief ray of a line light ray reaches. FIG. 5 is a schematic illustration of collimation of a line light ray in the sensor unit. FIG. 6 is a schematic illustration of collection of a line light ray in the sensor unit. FIG. 7 is a schematic illustration of an example image of a tire captured by the camera in the shape measuring system W. FIGS. 8A and 8B are schematic illustrations of distribution of measured data acquired by the shape measuring system w and shift of the data. FIG. 9 is a schematic illustration of an example image of a tire used for correction captured by the camera in the shape measuring system W. FIG. 10 is a schematic illustration of a positional shift between light section lines occurring when one light section line is generated from a plurality of continuous light section lines formed on a tire surface.

The configuration of the shape measuring system w for a tire according to an embodiment of the present invention is described first with reference to FIG. 1.

According to the embodiment of the present invention, the shape measuring system W for a tire captures images v1 to v3 of lines of light emitted to a surface of a rotating tire 1 (i.e., images of light section lines). The shape measuring system W then detects the surface shape of the tire 1 by detecting the shape based on the captured images using a light-section method. Since the tire 1 rotates about a rotation axis 1g thereof, the surface of the tire 1 moves relative to the line of light and the camera.

As shown in FIG. 1, the shape measuring system W for a tire includes a tire rotator 2, sensor units 3, a unit driving apparatus 4, an encoder 5, and an image processing apparatus 6.

The tire rotator 2 is an apparatus, such as a motor, for rotating the tire 1 about the rotation axis 1g thereof. Here, the tire 1 is an object having the shape to be measured. For example, the tire rotator 2 rotates the tire 1 at a rotation speed of 60 rpm. Thus, the shape measuring system W detects, using the sensor units 3 described below, the shapes of a tread surface and sidewall surfaces of an entire peripheral portion of the tire 1 within 1 second in which the tire 1 is rotated 360°.

Each of the sensor units 3 includes a light source that emits a line of light to the surface of the rotating tire 1 and a camera that captures an image of a light section line (an image of the line of light) formed on the surface of the tire 1. In the present embodiment, the following three sensor units 3 are used: two sensor units 3a and 3c for measuring the shapes of two sidewalls of the tire 1 and a sensor unit 3b for measuring the shape of a tread surface of the tire 1. These sensor units 3 are described in more detail below.

The unit driving apparatus 4 movably supports each of the sensor units 3 by using a driving unit, such as a servo motor, as a driving source. The unit driving apparatus 4 determines the position of each of the sensor units 3 relative to the tire 1. Before the tire 1 is mounted and dismounted onto and from the tire rotator 2, the unit driving apparatus 4 places each of the sensor units 3 at a predetermined standby position away from the tire 1. After a new tire 1 is mounted onto the tire rotator 2, the unit driving apparatus 4 positions each of the sensor units 3 at a predetermined inspection position in the vicinity of the tire 1.

The encoder 5 detects the rotation angle of a rotation shaft of the tire rotator 2, that is, the rotation angle of the tire 1. A detection signal output from the encoder 5 is used for controlling the timing of capturing an image of the cameras included in the sensor units 3.

The image processing apparatus 6 performs shutter control of the cameras included in the sensor units 3 (control of the timing of capturing an image) on the basis of the detection signal output from the encoder 5. For example, the image processing apparatus 6 performs control so that each time the encoder 5 detects that the tire 1 that is rotating at 60 rpm rotates at 0.09 ° (=360°/4000), the shutters of the cameras are released. In this way, image capturing is performed at a rate of 4000 frames per second.

In addition, the image processing apparatus 6 receives data of the captured image of the line of light emitted to the surface of the tire 1. The image processing apparatus 6 then performs a shape detection process using a light-section method on the basis of the captured image. Thereafter, the image processing apparatus 6 outputs shape data which is a result of the shape detection process (data representing the distribution of the height of the surface of the tire 1) to a host computer (not shown). At that time, the image processing apparatus 6 performs a predetermined imaging process on the sidewall surfaces of the tire 1 so as to remove images of letters printed on the sidewall surface. Thus, the image processing apparatus 6 extracts only the images of the lines of light and performs a shape detection process using a light-section method on the basis of the extracted images of the lines of light. The image processing apparatus 6 is configured by using, for example, a field programmable gate array (FPGA) or an application specific integrated circuit (ASIC).

Subsequently, the host computer determines whether each of the surface shapes detected for either side of the tire 1 satisfies a pre-defined criterion. The host computer then displays the determination results on a predetermined display unit or outputs the determination results in the form of a predetermined control signal.

Note that since the shape detection process using a light-section method is well known, the description thereof is not provided here.

The sensor unit 3 is described next with reference to FIG. 2, FIGS. 3A and 3B, and FIGS. 4A to 4C.

As shown in FIG. 2, the sensor unit 3 includes light projection devices 10 that output a plurality of lines of light and a camera 20.

In FIG. 2, an X-axis represents a tangential direction relative to the circumference of the rotation of the tire at a position where the shape of the tire 1 is measured. A Z-axis represents the height direction at the position where the shape of the tire 1 is measured (a direction of the detected height of the surface). A Y-axis represents a direction perpendicular to the X-axis and the Z-axis.

That is, in the sensor units 3a and 3c used for measuring the shapes of the sidewall surfaces of the tire 1, the Z-axis represents the direction of the rotation axis 1g of the tire 1. The Y-axis represents the radial direction of the tire 1 (a direction normal to the rotation axis 1g of the tire 1).

In contrast, in the sensor unit 3b used for measuring the shape of the tread surface of the tire 1, the Z-axis represents the radial direction of the tire 1. The Y-axis represents a direction of the rotation axis 1g of the tire 1.

The light projection devices 10 include a plurality of (three in FIG. 2) line light sources 11 to 13. The line light sources 11 to 13 emit lines of light so as to form the same number of separate light section lines Ls1 to Ls3 on the surface of the tire 1. Therefore, the line light sources 11 to 13 emit the lines of light in directions different from the direction in which the heights of the light section lines Ls1 to Ls3 are detected (i.e., the Z-axis direction).

FIG. 7 is a schematic illustration of an example of an image of the tire 1 captured by the camera 20. As shown in FIG. 7, the light projection devices 10 form the separate light section lines Ls1 to Ls3 on the surface of the tire 1. The light section lines Ls1 to Ls3 extend in the Y-axis direction (corresponding to the second direction) perpendicular to the X-axis direction (corresponding to the first direction) in which the surface of the tire 1 moves due to the rotation of the tire 1. The areas occupied by the light section lines Ls1 to Ls3 in the Y-axis direction are shifted with respect to each other (that is, the center points of the areas in the Y-axis direction are different). The coordinates of the light section lines Ls1 to Ls3 in the X-axis direction vary in accordance with the height of the surface of the tire 1.

In addition, as shown in FIG. 7, the light projection devices 10 form the separate light section lines Ls1 to Ls3 so that the end portions of neighboring pairs thereof overlap with each other in the Y-axis direction (a length direction of the light section lines Ls1 to Ls3). In this way, the measured data of the shape of the tire surface (the height distribution) can be obtained without loss of the data (i.e., continuously).

While the coordinates of two of the light section lines Ls1 and Ls3 in the X-axis direction are substantially the same in the example shown in FIG. 7, the coordinates of all of the light section lines Ls1 to Ls3 in the X-axis direction may be different.

The camera 20 includes a camera lens 22 and an image sensor 21 (a light receiving unit). The camera 20 captures the images v1 to v3 of the plurality of lines of light emitted to the surface of the tire 1 in a direction in which the chief rays Li1 to Li3 of the lines of light are specularly reflected by the surface of the tire 1 (an example of the image capturing means).

Accordingly, in the sensor units 3a and 3c for the sidewall surfaces, the light projection devices 10 emit a plurality of lines of light so as to form the separate light section lines Ls1 to Ls3 on the sidewall surface of the tire 1 in the Y-axis direction parallel to the radial direction of the tire 1. Therefore, the light projection devices 10 emit the plurality of lines of light in directions different from the direction in which the heights of the light section lines Ls1 to Ls3 are detected (i.e., the Z-axis direction) (an example of the first line light emitting means).

In contrast, in the sensor unit 3b for the tread surface, the light projection devices 10 emit a plurality of lines of light so as to form a plurality of light section lines Ls1 to Ls3 in the Y-axis direction perpendicular to the circumferential direction of the tread surface of the tire 1 (the moving direction of the tire surface). Therefore, the light projection devices 10 emit the plurality of lines of light in directions different from the direction in which the heights of the light section lines Ls1 to Ls3 are detected (i.e., the Z-axis direction) (an example of the second line light emitting means).

While the present embodiment is described with reference to emission of three lines of light onto each of the surfaces of the tire 1 (each of the three sensor units 3), two light rays or four or more light lays may be emitted to each of the surfaces of the tire 1 by decreasing or increasing the number of the line light sources 11 to 13.

The light projection devices 10 and the camera 20 are supported by a supporting mechanism (not shown) so that the view angle range of the camera 20 is located in a direction in which the chief rays (the rays traveling along the center lines) of the plurality of lines of light output from the line light sources 11 to 13 are specularly reflected by the surface of the tire 1. In this way, the camera 20 captures the images v1 to v3 of the light section lines in a direction in which the chief rays of the plurality of lines of light are specularly reflected by the surface of the tire 1 (an example of the image capturing means). For example, the positional relationship between the light projection device 10 and the camera 20 may be determined through the following process. The location and the orientation of the camera 20 are set to a direction different from the height direction in which the light section line is detected first and, subsequently, the locations and orientations of the line light sources 11 to 13 of the light projection device 10 are set so that the specularly reflected chief rays of the lines of light travel towards the image capturing range of the camera 20.

That is, in the sensor units 3a and 3c for the sidewall surfaces, the camera 20 captures the images v1 to v3 (the images of the light section lines Ls1 to Ls3) of the plurality of lines of light emitted by the light projection devices 10 onto the sidewall surface of the tire 1 (an example of the first image capturing means).

In addition, in the sensor unit 3b for the tread surface, the camera 20 captures the images v1 to v3 of the plurality of lines of light emitted by the light projection device 10 onto the tread surface of the tire 1 in a direction in which the chief rays of the line of light are specularly reflected by the tread surface (an example of the second image capturing means).

FIGS. 3A and 3B and FIGS. 4A to 4C are schematic illustrations of the arrangement of the light projection device 10 and the camera 20 in the sensor unit 3. More specifically, FIGS. 3A and 3B illustrate the arrangement of positions P1, P2, and P3 to which the chief rays of the line of light (hereinafter referred to as "chief ray arrival points") when viewed in a direction perpendicular to the tire surface. Note that FIGS. 3A, 4A, and 4C are diagrams for the sensor units 3a and 3c for the sidewall surfaces. FIGS. 3B and 4B are diagrams for the sensor unit 3b for the tread surface.

As shown in FIGS. 3A and 3B, in the sensor units 3 for either of the sidewall surface and the tread surface, the line light sources 11 to 13 and the camera 20 are disposed so that, when viewed from the Y-axis direction, the angle formed by each of chief rays Li1, Li2, and Li3 of the line of light and the Z-axis (or the surface of the tire 1) is equal to an angle formed by a line between each of chief ray arrival points P1, P2, and P3 and the center of the image sensor 21 of the camera 20 (hereinafter referred to as "imaging center lines Lo1, Lo2, and Lo3") and the Z-axis (or the surface of the tire 1).

In addition, as shown in FIGS. 4A to 4C, in any one of the sensor units 3 for the sidewall and the tread, the line light sources 11 to 13 and the camera 20 are disposed so that, when each of the chief ray arrival points P1, P2, and P3 is viewed in a direction perpendicular to the tire surface, each of the chief rays Li1, Li2, and Li3 of the line light rays is collinearly aligned with the corresponding one of the imaging center lines Lo1, Lo2, and Lo3.

Note that the positional relationship between the light projection device 10 and the camera 20 has been described using, as a reference position, the surface of the tire 1 (the surface of the chief ray arrival points P1, P2, and P3) that the chief rays of the lines of light reach. The positional relationship is not determined by determining the positions of the light projection device 10 and the camera 20 for each of the inspected tires 1, but is determined on the basis of the average surface shape of the tires 1 to be inspected. For example, first, an imaginary reference surface that represents the average surface shape of the tires 1 to be inspected is determined. Subsequently, the light projection device 10 and the camera 20 are supported by a predetermined support mechanism so that the image capturing range of the camera 20 is located in a direction at which the chief rays of the lines of light emitted onto the surface of the tire 1 are specularly reflected by the reference surface.

The image processing apparatus 6 performs a light section line coordinate detection process (an example of the light section line coordinate detection means). In the light section line coordinate detection process, each time the encoder 5 detects a rotation of the tire 1 at a predetermined unit angle (e.g., 0.09°) while the tire 1 rotates 360° (that is, at predetermined angular intervals), the coordinates of each of the images v1 to v3 of the light section lines Ls1 to Ls3 are detected from the corresponding one of the independent images of pre-defined image processing target areas A1 to A3 (see FIG. 7) in the coordinate system of the image captured by the camera 20 for each of a plurality of images captured by the camera 20 (images captured while the tire 1 rotates one revolution (360°)). Here, the independent image processing target areas A1 to A3 are areas having pre-defined coordinates for the separate light section lines Ls1 to Ls3 formed on the surface of the tire 1, respectively.

As shown in FIG. 7, the shape measuring system W forms the separate light section lines Ls1 to Ls3 on the surface of the tire 1. Accordingly, by determining the distances between neighboring pairs of the light section lines Ls1 to Ls3 to be sufficiently larger than the positional variation widths of the light section lines Ls1 to Ls3 that vary in accordance with the surface shape of the tire 1, the independent image processing target areas A1 to A3 respectively corresponding to the light section lines Ls1 to Ls3 can be pre-defined in the coordinate system of an image captured by the camera 20. In an example shown in FIG. 7, an area A1 having an X coordinate greater than or equal to x1 and a Y coordinate less than y1 corresponds to the light section line Ls1. In addition, an area A2 having an X coordinate less than x1 and a Y coordinate greater than or equal to y1 and less than y2 corresponds to the light section line Ls2. Similarly, an area A3 having an X coordinate greater than or equal to x1 and a Y coordinate greater than y2 corresponds to the light section line Ls3. The image processing target areas A1 to A3 are areas in which only the images v1 to v3 of the light section lines Ls1 to Ls3, which have a one-to-one correspondence with the image processing target areas A1 to A3, are present in the images of these areas, and no other images of the light section lines are present, respectively.

For example, in order to determine these independent image processing target areas A1 to A3, an object for correction having a known shape is measured by the shape measuring system W (the image is captured by the camera 20). Subsequently, the image processing target areas A1 to A3 are calculated using the positions (the coordinates) of the images v1 to v3 of the light section lines Ls1 to Ls3 in the captured image. The calculation results are stored in a memory of the image processing apparatus 6.

In addition, for each of the images of the independent image processing target areas A1 to A3, the image processing apparatus 6 detects the coordinates of the light section lines by detecting the coordinates of a pixel having the highest luminance for each line in the X-axis direction (the moving direction of the tire surface, corresponding to the first direction). In this way, the image processing apparatus 6 detects the coordinates of each of the images v1 to v3 of the separate light section lines Ls1 to Ls3 from the corresponding one of the independent image processing target areas A1 to A3. Accordingly, the image processing apparatus 6 can detect the coordinates of the images v1 to v3 of the light section lines Ls1 to Ls3 through such a simple process (i.e., a high-speed process) that the position of the pixel having the highest luminance is detected for each line. As a result, even when the images of the light section lines Ls1 to Ls3 are captured at a high image capture rate (e.g., 4000 frames per second), the load for processing an image required for detecting the light section line can be reduced so that such a high image capture rate is supported.

The Y coordinate of each of the light section lines Ls1 to Ls3 acquired in the above-described manner represents the position of the light section lines Ls1 to Ls3 in the length direction, that is, the position in the radial direction of the tire 1 for the sidewall surface, and the position in the rotation axis direction of the tire 1 for the tread surface. In addition, the X coordinate of each of the light section lines Ls1 to Ls3 represents the height of the surface of the tire 1.

Subsequently, the image processing apparatus 6 converts the X coordinates of the light section lines Ls1 to Ls3 detected from the captured images (the coordinates of the light section lines detected in accordance with the rotation angles) into the height of the surface of the tire 1 using a predetermined conversion coefficient. The image processing apparatus 6 then outputs, to a host computer, the converted tire surface shape information, that is, the rotation angle information about the tire 1 (e.g., the count number output from the encoder 5) and information about a correspondence between the Y coordinate of each of the light section lines Ls1 to Ls3 and the height of the surface of the tire 1.

Here, when the height values of the surface of the tire 1 calculated from the coordinates of the light section lines in the Y-axis direction (corresponding to the second direction) detected in accordance with the rotation angles (at predetermined angular intervals) are sequentially arranged, this arrangement indicates the distribution of the one-dimensional surface heights in the moving direction of the tire surface. Accordingly, the rotation angle of the tire 1 and the correspondence between the Y coordinate of each of the light section lines Ls1 to Ls3 and the height of the surface of the tire 1 represent information about the distribution of the surface height in the moving direction of the surface of the tire 1 (corresponding to the first direction). Note that the image processing apparatus 6 that performs a process for converting the X coordinate to the surface height of the tire 1 is an example of the first surface shape calculating means.

In order to determine the conversion coefficient used for converting the X coordinates of the light section lines Ls1 to Ls3 to the surface heights of the tire 1, the shape measuring system W, for example, measures an object for correction having a known shape (the image of the object is captured by the camera 20). The conversion coefficient is then calculated using a correspondence between the position (the coordinates) of the image of each of the light section lines Ls1 to Ls3 and the surface height of the object for correction. The calculation result is stored in the memory of the image processing apparatus 6.

Alternatively, using the measured result of the object for correction, a conversion coefficient used for converting the surface height of the tire 1 to the X coordinates of the light section lines Ls1 to Ls3 may be pre-calculated and stored in the memory of the host computer. Subsequently, the host computer may evaluate the surface shape of the tire 1 using the value of the X coordinate.

When the tire surface is inspected, only conversion of the X coordinate to the surface height is sufficient if a one-dimensional profile in the X-axis direction (the moving direction of the tire surface) at each of the positions in the Y-axis direction is sufficient.

In contrast, when a two-dimensional profile of the tire surface (in the X-axis and Y-axis directions) is required for inspection of the tire surface, only conversion from the X coordinate to the surface height is insufficient.

FIGS. 8A and 8B are schematic illustrations of distribution of measured data acquired by the shape measuring system and shift of the data.

In particular, FIG. 8A is a schematic illustration of the arrangement of the tire surface height information for the image processing target areas A1 to A3. In FIG. 8A, the abscissa represents the rotation angle information of the tire 1 (e.g., the rotation angle or the count number of pulses output from the encoder 5) when data are measured, and the ordinate represents the Y coordinates of the light section lines Ls1 to Ls3 (in the length direction of the light section lines).

As shown in FIG. 7, in the shape measuring system W, the light section lines Ls1 to Ls3 respectively corresponding to the image processing target areas A1 to A3 are separately formed. Accordingly, the positions of the tire surface shape (the distribution of the heights in the length direction of the light section line) calculated from each of the light section lines Ls1 to Ls3 in one captured image are different in the moving direction of the tire surface (the X-axis direction). In FIGS. 8A and 8B, measurement data d11 and d31 for the areas A1 and A3 and measurement data d21 for the area A2 are data for the same position in the moving direction. Similarly, measurement data d12 and d32 for the areas A1 and A3 and measurement data d22 for the area A2 are data for the same position in the moving direction. Note that, in the example shown in FIGS. 8A and 8B, the measurement data corresponding to the image processing target areas A1 and A3 are not shifted with respect to each other in the X-axis direction.

Let θs denote a shift amount of a rotation angle of the tire converted from the positional shift in the moving direction of the tire surface (in the X-axis direction). Then, as shown in FIG. 8A, in order to make the positions of the tire surface in the X-axis direction (the moving direction of the tire surface) in the measurement data corresponding to the image processing target areas A1 and A2 the same, the rotation angle at the measurement time needs to be shifted by θs.

FIG. 8B is a schematic illustration of the arrangement of the tire surface height information for the image processing target areas A1 to A3 after the measurement data corresponding to the image processing target area A2 is shifted by θs obtained at a measurement time. In FIG. 8B, the abscissa represents the positional information of the tire surface in the moving direction, and the ordinate represents the Y coordinates of the light section lines Ls1 to Ls3 (in the length direction of the light section lines).

Accordingly, the shape measuring system W or the host computer can calculate the distributions of the surface height in the X-axis direction (the first direction) and the Y-axis direction (the second direction) of the tire 1 on the basis of a plurality of the coordinates of the light section lines detected by the image processing apparatus 6 in accordance with the rotation angles of the tire 1 and the setting information about the shift amounts θs of the tire rotation angles corresponding to the positional shift amount among the separate light section lines Ls1 to Ls3 in the X-axis direction (corresponding to the first direction) (an example of the second surface shape calculating means). Here, the angle shift information includes the shift amounts θs of the tire rotation angles or an information item corresponding to the shift amounts θs, which is pre-defined information (information stored in a memory of the image processing apparatus 6 or a host computer). Note that the angle shift information is pre-defined information about shift amounts of rotation (shift amounts in the rotation angle in this embodiment) corresponding to the positional shifts among the separate light section lines Ls1 to Ls3 in the X-axis direction (corresponding to the first direction). The angle shift information is an example of the above-described setting shift information.

More specifically, the image processing apparatus 6 performs the following two processes: a process for converting the X coordinate of each of a plurality of the coordinates of the light section lines detected in accordance with the rotation angle to the height of the tire surface using a predetermined conversion coefficient and a process for shifting the plurality of the coordinates of the light section lines detected for each of the image processing target areas A1 to A3 by an amount corresponding to the shift amount θs on the basis of the pre-defined angle shift information. In this way, the image processing apparatus 6 can calculate the distributions of the surface height in the moving direction of the surface of the tire 1 (the first direction) and a direction perpendicular to the moving direction (the second direction).

To acquire the shift amount θs of the tire rotation angle, the shape measuring system W measures an object for correction having a known shape (the image of the object is captured by the camera 20). Subsequently, image processing is performed on the captured image so that the shift amount θs is calculated.

FIG. 9 is a schematic illustration of an example of an image of an object for correction having a known shape and captured by a camera of the shape measuring system W.

In FIG. 9, the object to be measured for correction in the captured image has a planar surface to be measured, and a scale mk that indicates the rotation angle of the tire is printed on the planar surface.

The shape measuring system W pre-measures the object for correction (the image of the object is captured by the camera 20). Thereafter, the tire shape measuring system W determines the rotation angle of the tire corresponding to a shift amount among the light section lines Ls1 to Ls3 in the X-axis direction using the scale mk in the captured image. The readout angle indicates the shift amount θs of the rotation angle of the tire.

In the measurement process performed by the shape measuring system W, if a variation (an individual difference) in the tire surface shape (the height of the tire surface) is small relative to the distance between neighboring pairs among the light section lines Ls1 to Ls3, no problem occurs even when the coordinates of the image processing target areas A1 to A3 respectively corresponding to the light section lines Ls1 to Ls3 are fixed.

However, if the variation in the tire surface shape is large and the coordinates of the image processing target areas A1 to A3 are fixed, the positions of the light section lines Ls1 to Ls3 are shifted beyond the respective image processing target areas A1 to A3 (hereinafter referred to as an "out-of-area state"). Thus, the coordinates of the light section lines Ls1 to Ls3 may not be properly detected.

However, in general, the surface shape of the tire 1 tends to gradually change. Accordingly, when the surface shape of a tire markedly changes, a variation in the positional relationship among the light section lines Ls1 to Ls3 remains within a small variation range. In contrast, the total position of the light section lines Ls1 to Ls3 (in particular, the position in the X-axis direction) significantly changes.

Therefore, in the shape measuring system W, the image processing apparatus 6 may perform a process for automatically determining the coordinates of the image processing target areas A1 to A3 in advance (i.e., before actual measurement is conducted). Here, the image processing apparatus 6 is an example of the image processing target area automatic setting means.

More specifically, the image processing apparatus 6 detects the position of a pixel having a luminance higher than or equal to a predetermined setting value in at least one area A0 (hereinafter referred to as a "trial area") of an image captured by the camera 20. Thereafter, the image processing apparatus 6 shifts the coordinates of independent pre-defined reference areas (reference areas corresponding to the image processing target areas A1 to A3) in accordance with the detected position of the pixel having a luminance higher than or equal to the predetermined setting value in the trial area. Thus, the coordinates of the independent image processing target areas A1 to A3 are automatically set.

Here, the coordinates of the reference areas are calculated by, for example, the shape measuring system W as follows. The tire shape measuring system W measures an object for correction having a known shape (the image of the object is captured by the camera 20). The coordinates of the reference areas are then calculated on the basis of the positions (the coordinates) of the light section lines Ls1 to Ls3 in the captured image and are stored in the memory of the image processing apparatus 6.

In addition, the setting level is such a luminance level that the pixel is determined to be part of the light section line if a pixel has a luminance higher than or equal to the luminance level.

For example, as shown in FIG. 7, the trial area A0 is defined as an area starting from the position having the smallest coordinate in the Y-axis direction to the position having a coordinate of a predetermined value y0. The image processing apparatus 6 sequentially scans pixels in the trial area A0 from the position having the smallest coordinate in the Y-axis direction for each line in the X-axis direction so as to detect the coordinates and the luminance of a pixel having the highest luminance. At the same time, the image processing apparatus 6 determines whether the detected luminance is higher than or equal to the above-described setting level. In addition, when the luminance of a pixel having the highest luminance becomes higher than or equal to the setting level for the first time, or the luminance of all pixels having the highest luminance in a predetermined number of continuous lines (e.g., two or three continuous lines) becomes higher than or equal to the setting level for the first time, the image processing apparatus 6 detects the X coordinate of the pixel or the average X coordinate of the pixels. The image processing apparatus 6 then shifts the X coordinates of the independent reference areas in accordance with the detected X coordinate or the average X coordinate. Thereafter, the image processing apparatus 6 automatically sets the shifted coordinates as those of the image processing target areas A1 to A3 and stores the coordinates in a predetermined memory.

For example, in the example shown in FIG. 7, a difference between the X coordinate of a pixel having a luminance higher than or equal to the setting level and the X coordinate of the light section line Ls1 obtained by measuring the object for correction is determined to be a shift amount from the coordinate of the reference area to the coordinates of the image processing target areas A1 to A3.

In this way, the coordinates of the independent reference areas are pre-set when the surface height of the tire 1 is a predetermined reference height (a known height). Here, even when a variation in the tire surface shape is large, only a particular one of the light section lines (the light section line Ls1 in the example shown in FIG. 7) always passes through the trial area A0. The position of a pixel having a luminance higher than or equal to the setting level in the trial area A0 (i.e., the position of part of the particular light section line) is detected. By shifting the coordinates of the reference areas (in particular, shifting of the X coordinate) on the basis of the detected position to obtain the coordinates of the image processing target areas A1 to A3, the occurrence of the above-described out-of-area state can be prevented.

As noted above, in the tire shape measuring process using the shape measuring system W, the light projection devices 10 and the camera 20 are supported by a support mechanism (not shown) so that the view angle range of the camera 20 is located in a direction in which the chief rays (the rays traveling along the center lines) of the plurality of line light rays are specularly reflected by the surface of the tire 1. With the light projection devices 10 and the camera 20 being supported as described above, the light projection devices 10 emit a plurality of lines of light onto the surface of the tire 1. The camera 20 captures the images of the light section lines (the images of the light section lines Ls1 to Ls3) at predetermined angular intervals of the rotation of the tire 1 (an example of the line light emitting and image capturing step).

In addition, for each of the plurality of images captured by the camera 20, the image processing apparatus 6 (an example of computing means) detects the coordinates of the images of the light section lines Ls1 to Ls3 (the coordinates of the light section lines) from the images of the independent image processing target areas A1 to A3 that are pre-defined for the separate light section lines Ls1 to Ls3 in the coordinate system of an image captured by the camera 20, respectively (an example of the light section line coordinate detecting step).

Furthermore, the image processing apparatus 6 or the host computer (an example of the computing means) computes the distribution of the tire surface height (the one-dimensional or two-dimensional distribution) on the basis of the plurality of light-section line coordinates detected in accordance with the rotation angle of the tire (an example of the surface shape computing step).

When a line light ray is emitted onto a black and glossy surface of the tire 1, the amount of specularly reflected light is larger than the amount of diffuse reflected light in a particular direction (an image capturing range of the camera). In addition, the surface of the tire 1 (in particular, the sidewall surface) is curved. Accordingly, even when the camera 20 captures the image of a line of light having a long line length in a direction in which the chief ray of the line light ray is specularly reflected, specularly reflected light rays output from either end portion of the light line, which is remote from the chief ray, do not reach the camera 20.

For example, in FIG. 2, if the length of the line of light output from the light source 12 at the middle is increased, specularly reflected light rays output from either end portion of the light line, which is remote from the chief ray, travel in directions entirely different from the direction towards the camera 20. Accordingly, part of the image of the light line remote from the center thereof becomes unclear due to an insufficient amount of reflected light reaching the camera 20.

In contrast, the shape measuring system W captures an image of the line of light by the camera 20 disposed in a direction in which the line of light emitted to the surface of the tire 1 is specularly reflected. Accordingly, the shape measuring system W can acquire a clear image of the line of light emitted to the surface of the tire 1 without increasing the intensity of the line of light (without using a high-power line light source) even when the image of the line of light is captured at a sufficiently high image capture rate (e.g., 4000 or more frames per second). In addition, since the line light sources 11 to 13 emit lines of light having a relatively short line length onto the tire surface, and the camera 20 is disposed in a direction in which the chief rays of the lines of light are specularly reflected, clear images of all of the line of light can be obtained. As a result, the surface shape of the tire 1 can be detected with a high spatial resolution and at a high speed without thermally damaging the tire 1.

Furthermore, the shape measuring system W includes a plurality of the sensor units 3 each including a set of the light projection devices 10 (the line light emitting means) and the camera 20. In the plurality of sensor units 3, the light projection devices 10 simultaneously emit lines of light to a plurality of surfaces of the tire 1 (the front and back sidewall surfaces and the tread surface), and the cameras 20 capture the images of the light section lines. In this way, the shapes of the plurality of surfaces of the tire (the sidewall surfaces and the tread surface) can be simultaneously measured, and therefore, the time required for measuring the shapes of all of the target surfaces of the tire 1 can be reduced.

In addition, as shown in FIG. 5, the shape measuring system W according to the embodiment of the present invention can include a collimating lens 30 (corresponding to the collimating means) for collimating each of a plurality of lines of light emitted to the surfaces of the tire 1 by the light projection devices 10 (corresponding to the line light emitting means) in the length direction of the light line.

Alternatively, as shown in FIG. 6, the shape measuring system W can include a condenser lens 40 (corresponding to the condensing means) for condensing each of the plurality of lines of light emitted to the surfaces of the tire 1 by the light projection devices 10 (corresponding to the line light emitting means) in the length direction of the light line.

By using the collimating lens 30 or the condenser lens 40, even when the line lengths of the plurality of lines of light emitted to the curved surface of the tire 1 are slightly increased, a direction in which the light rays separated from the chief ray of the line of light towards either end of the chief ray are specularly reflected can be made close to the direction of the image capturing range of the camera 20. As a result, the number of lines of light can be reduced, and therefore, the structure of the apparatus can be simplified.

In addition, while the foregoing embodiment has been described with reference to the light projection devices 10 including the plurality of light sources (the line light sources 11 to 13), a light projection device having a different structure for emitting a plurality of lines of light in order to form the light section lines Ls1 to Ls3 on the tire surface may be employed.

For example, in another embodiment, the light projection device 10 may include one line light source and an optical unit that separates a line of light emitted from the line light source into a plurality of lines of light and emits the plurality of separate lines of light so that the separate light section lines Ls1 to Ls3 are formed on the tire surface. In this way, the number of light sources can be reduced.

Alternatively, the light projection device 10 may be provided for each of the surfaces of the tire 1 to be measured. Each of the light projection devices 10 may include one of the line light sources 11 to 13 that output lines of light having different wavelengths corresponding to the surfaces to be measured.

In such a case, each of the sensor units 3 includes, in an optical path of the light incident on the camera 20, an optical filter that selectively passes therethrough light having a predetermined wavelength and output from the light projection device 10 of the camera 20.

For example, the light projection devices 10 in the sensor units 3a to 3c may emit lines of light having the wavelengths of 650 nm, 670 nm, and 690 nm, respectively. Bandpass filters that selectively pass therethrough light having the wavelengths of 650±5 nm, 670±5 nm, and 690±5 nm may be disposed in front of the cameras 20 that capture the images of these lines of light.

In this way, when the shape of one of the surfaces of the tire 1 is measured, the line of light used for measuring the shape of another surface does not interfere with the measurement as noise light.

Furthermore, a plurality of the light projection devices 10 may output lines of light having different colors (wavelengths), and the image processing apparatus 6 may extract, as an image of the light line, an image of a corresponding color (a corresponding wavelength) from an image (color image) captured by each of the cameras 20 for capturing a color image.

In addition, the foregoing embodiment has been described with reference to the example in which the shape of the tire 1 is measured while the tire rotator 2 rotates the tire 1 about the rotation axis 1g of the tire 1.

However, the tire 1 may be stationary, and the entire shape measuring system W or the sensor units 3 (3a to 3c) of the shape measuring system W may be rotated about the rotation axis 1g of the tire 1 by a predetermined rotating mechanism.

In addition, it is desirable that the shape measuring system W includes a proximity sensor that detects the proximity of the sensor units 3 (3a to 3c) to the tire 1 within a predetermined distance. The unit driving apparatus 4 can perform control on the basis of the detection result of the proximity sensor so that the sensor units 3 (3a to 3c) are not brought into contact with the tire 1.

Furthermore, it is desirable that the support mechanism for supporting the sensor units 3 (3a to 3c) includes an arm portion that turns towards the rotation direction of the tire 1 when an excessive force is applied to each of the sensor units 3 in the rotation direction of the tire 1 or a damper that absorbs a shock of the excessive force.

In this way, even when the sensor units 3 are brought into contact with the tire 1, the damage of the apparatus can be prevented.

In addition, while the foregoing embodiment has been described with reference to the shape measuring system W that measures a moving tire surface of the rotating tire 1, the present invention is not limited thereto. For example, a shape measuring system having a similar structure can measure the surface shape of any object, such as a metal member.

For example, the sensor units 3 may be disposed so as to face one of the side surfaces or the front and back surfaces of a linearly moving belt-shaped or plate-shaped rolled material. If the image processing apparatus 6 and the host computer (not shown) perform the process similar to that of the foregoing embodiment, the surface shape of the rolled material can be contactlessly measured at a high speed.

Furthermore, as described in the foregoing embodiment, the sensor units 3 may be stationary and the surface of the rolled material may be moved. Alternately, an object to be measured may be stationary, and the sensor units 3 may be linearly or rotationally moved along the surface of the object to be measured.

(2)

Figure 11:
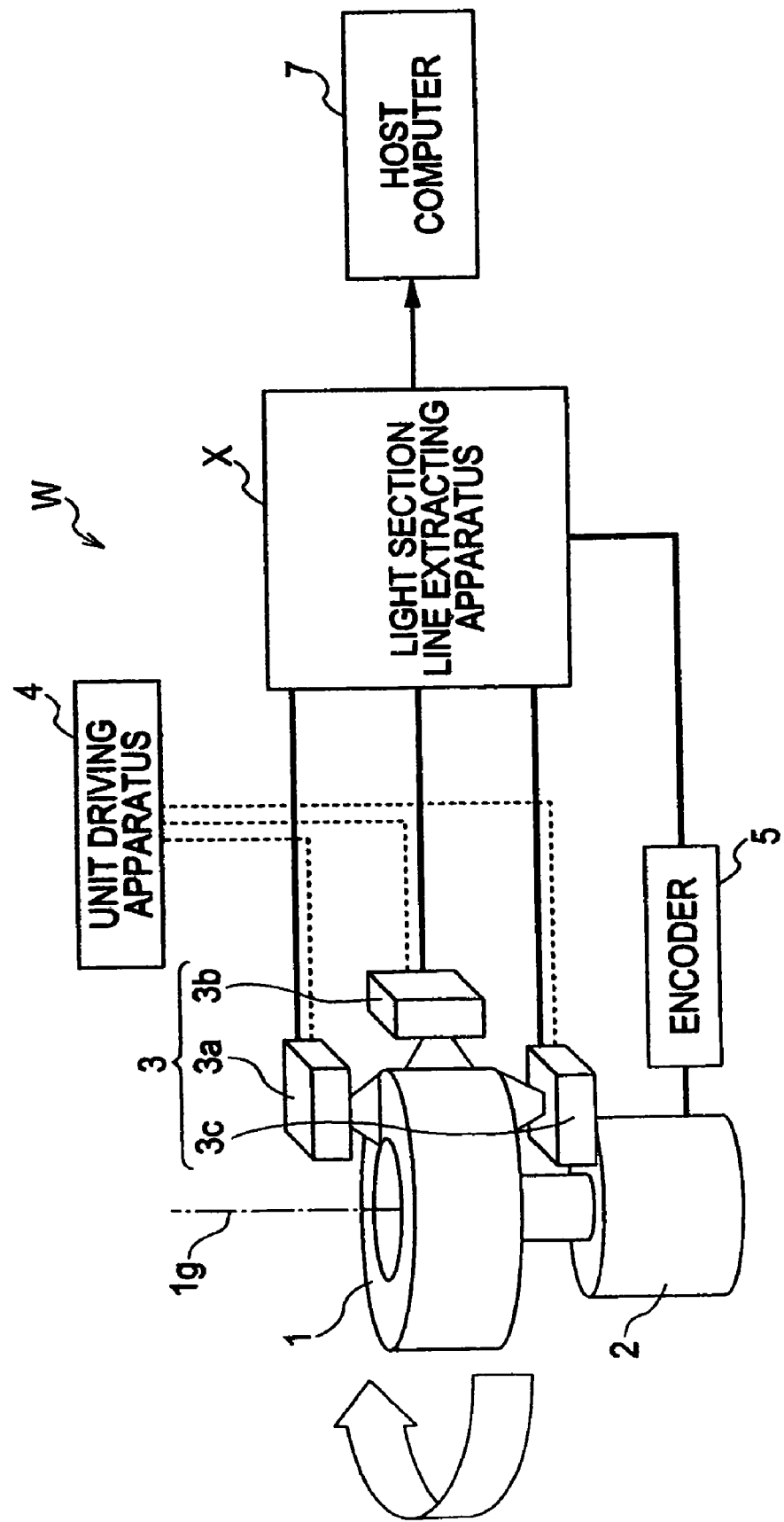
FIG. 11 is a schematic illustration of an exemplary structure of a shape measuring system including a light section line extracting apparatus according to an embodiment of the present invention.
Figure 12:
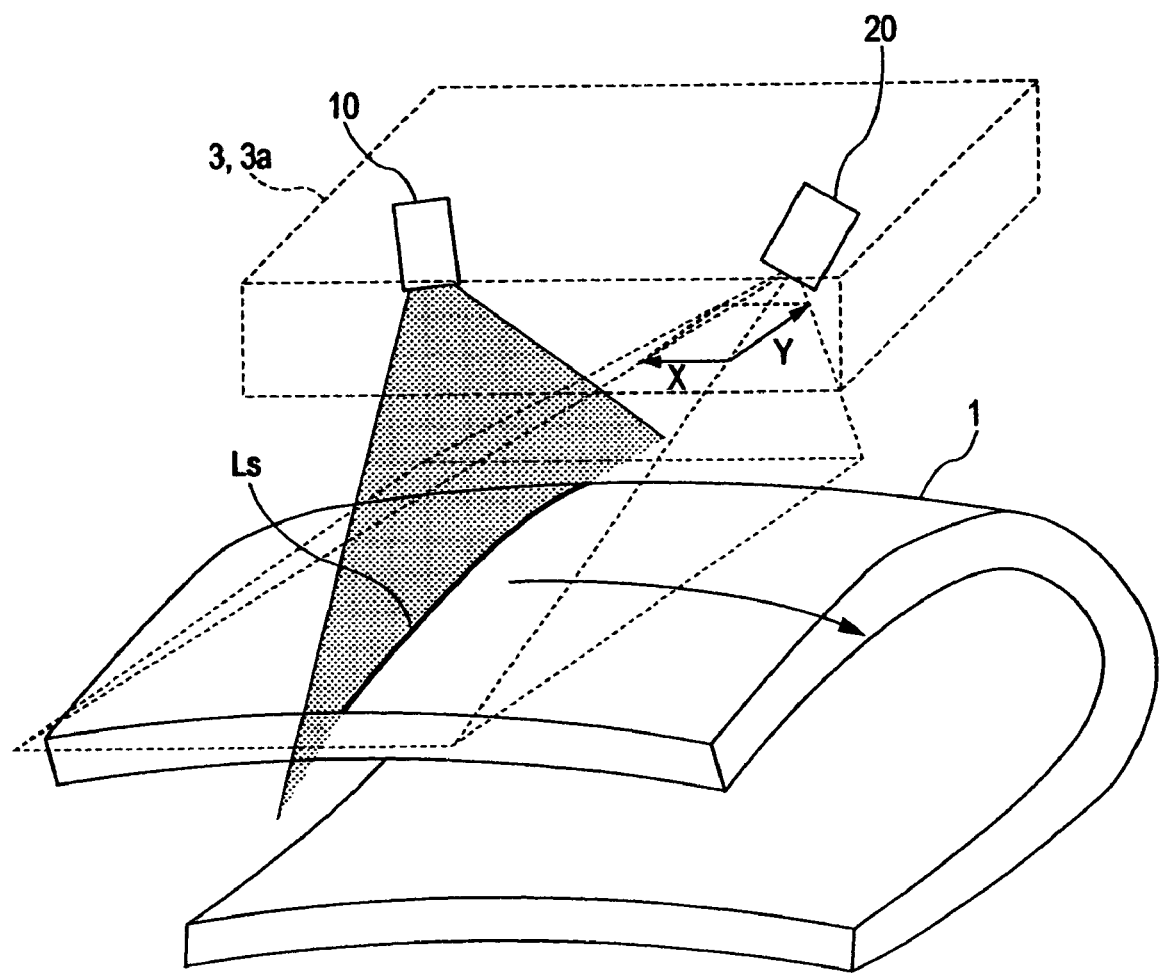
FIG. 12 is a three-dimensional schematic illustration of an arrangement of a light source and a camera in a sensor unit included in the shape measuring system.
Figure 13:
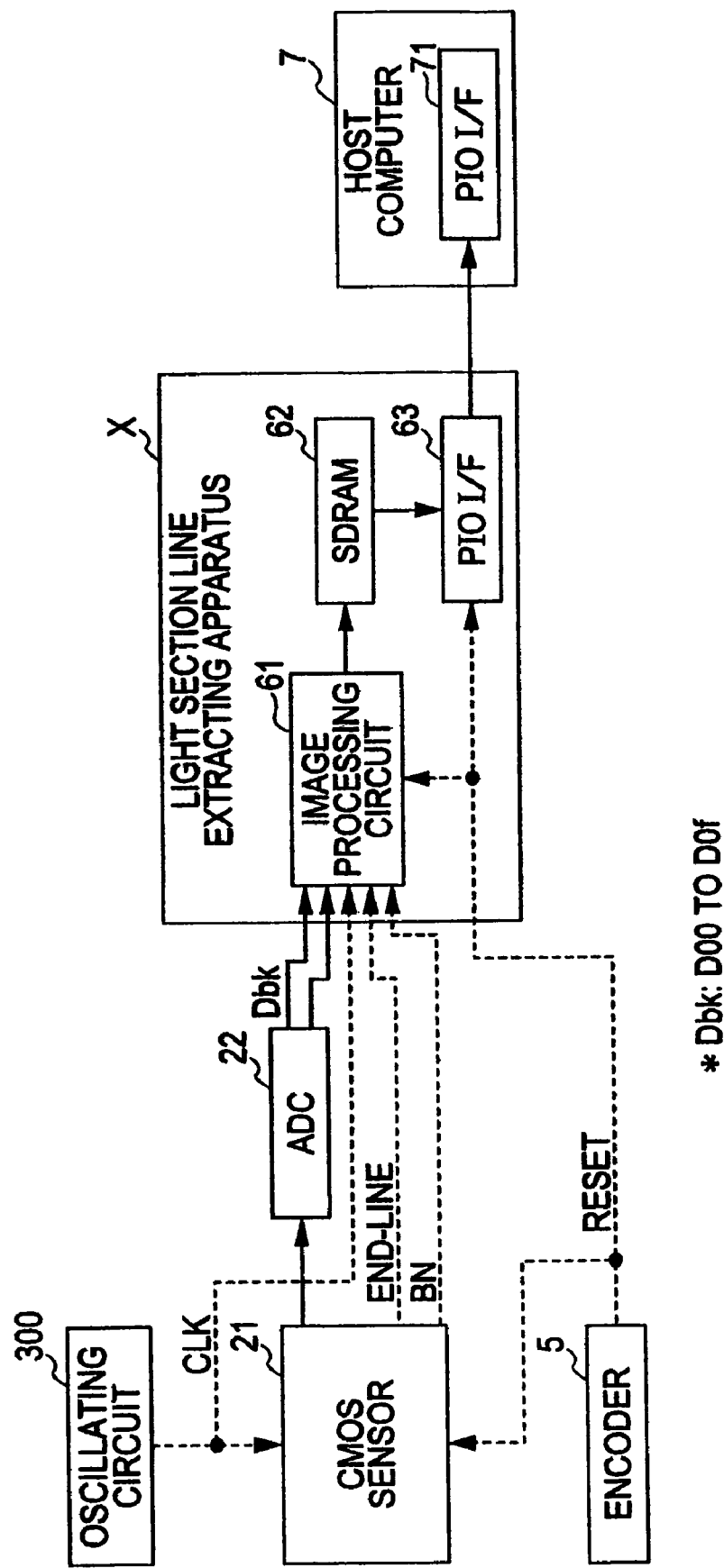
FIG. 13 is a schematic block diagram of the light section line extracting apparatus and an apparatus that communicates signals with the light section line extracting apparatus.
Figure 14:
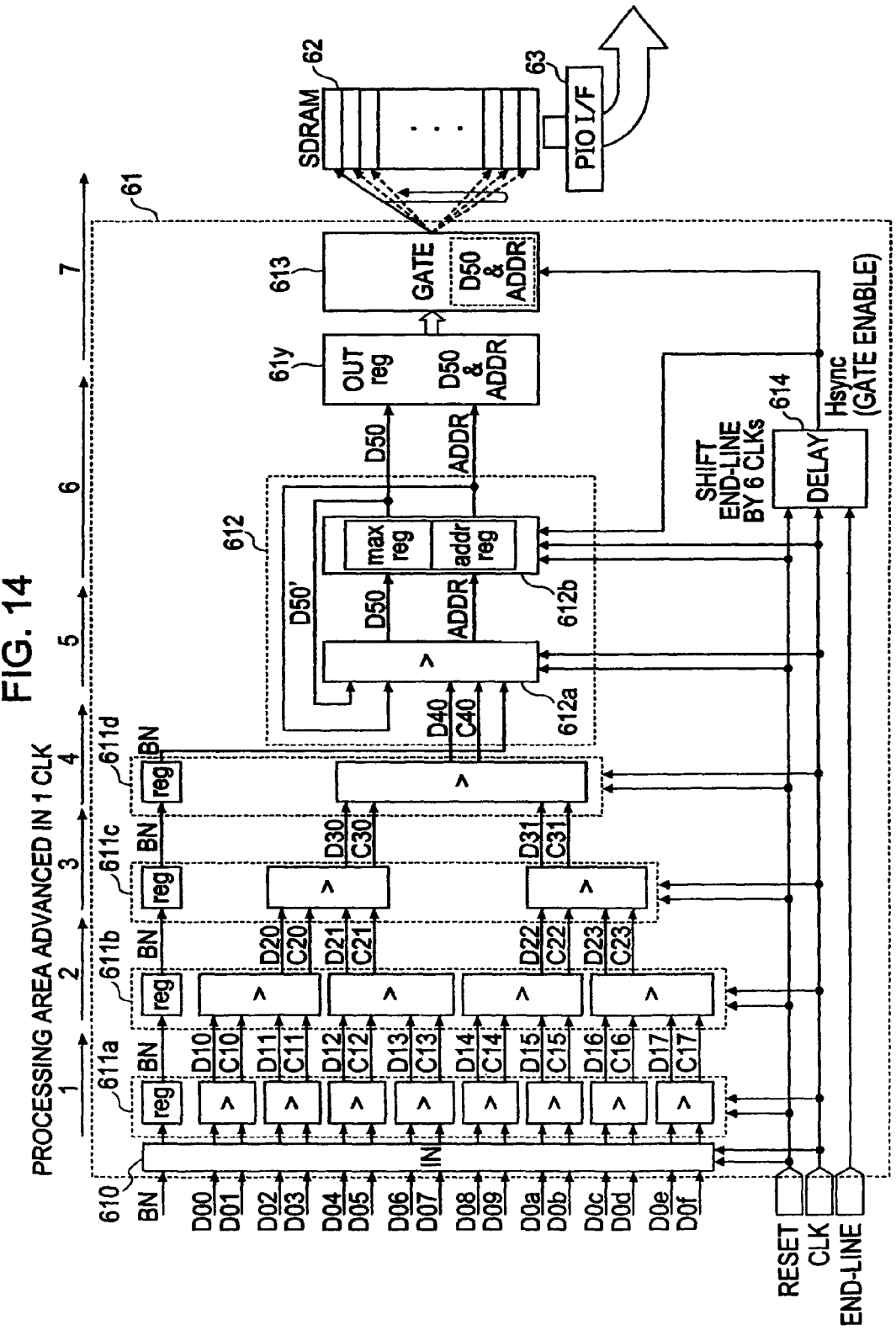
FIG. 14 is a schematic block diagram of an image processing circuit included in the light section line extracting apparatus.
Figure 15:
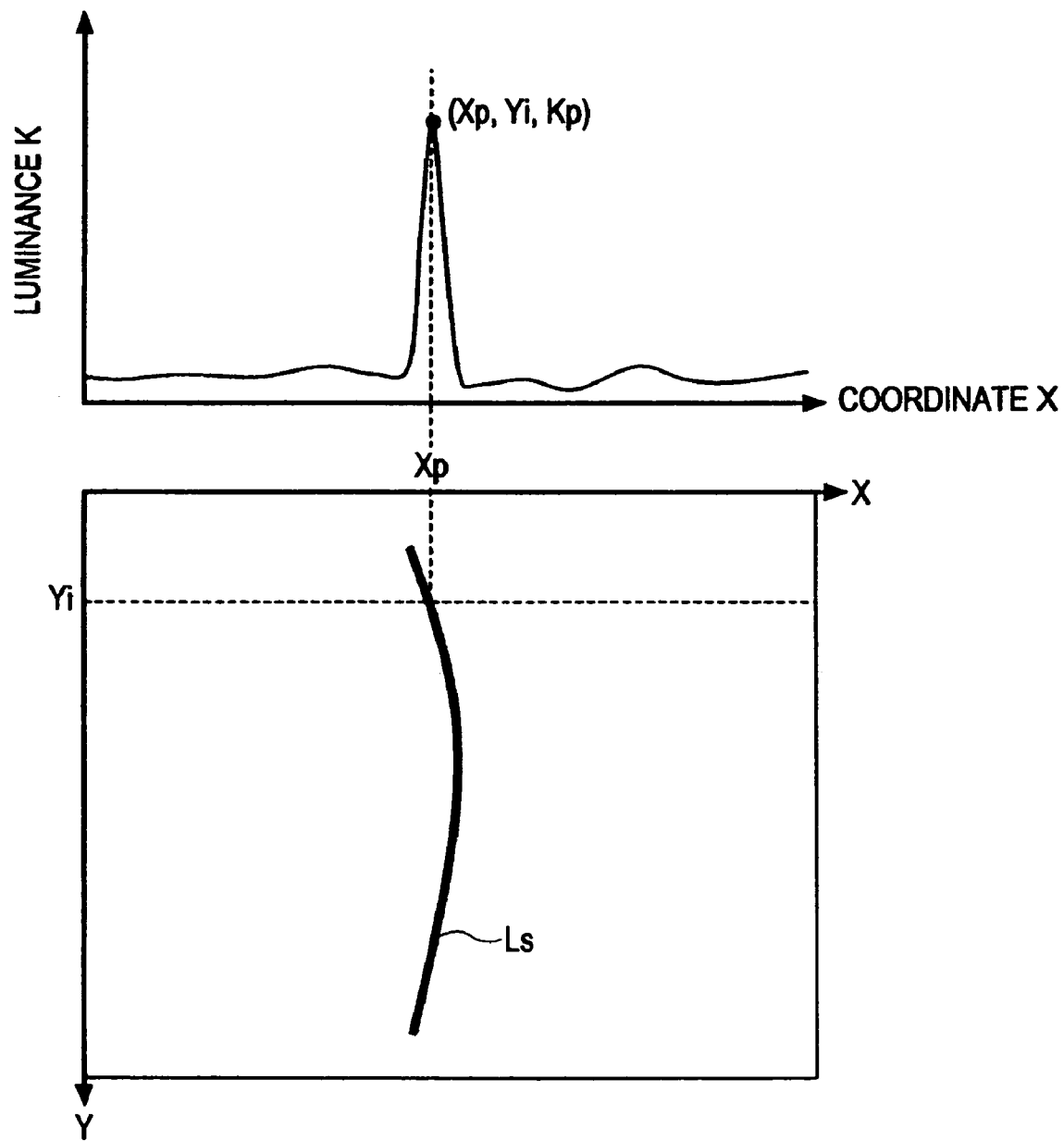
FIG. 15 is a schematic illustration of a relationship between a captured image and data detected by the light section line extracting apparatus.

FIG. 11 is a schematic illustration of an exemplary structure of a shape measuring system W including a light section line extracting apparatus X according to an embodiment of the present invention. FIG. 12 is a three-dimensional schematic illustration of an arrangement of a light source and a camera in a sensor unit included in the shape measuring system W. FIG. 13 is a schematic block diagram of the light section line extracting apparatus X and an apparatus that communicates signals with the light section line extracting apparatus X. FIG. 14 is a schematic block diagram of an image processing circuit included in the light section line extracting apparatus X. FIG. 15 is a schematic illustration of a relationship between a captured image and data detected by the light section line extracting apparatus X.

The shape measuring system W for a tire including the light section line extracting apparatus X and the sensor unit according to an embodiment of the present invention are described first with reference to FIGS. 11 and 12.

The shape measuring system W captures an image of a line of light (slit light) (an image of a light section line Ls) emitted onto a rotating tire 1 using a camera 20 (a CMOS sensor 21 serving as an image sensor included in the camera 20). Thereafter, the shape measuring system W detects the shape using a light-section method on the basis of the captured image so as to detect the surface shape of the tire 1. Since the tire 1 rotates about a rotation axis 1g thereof, the surface of the tire 1 moves relative to the line of light and the camera.

The image sensor captures a two-dimensional image including an image of the light section line formed on the surface of the rotating tire 1. The light section line extracting apparatus X included in the shape measuring system W receives luminance data about each of the pixels of the image captured by the image sensor. The shape measuring system W then performs a light section line extracting process in which the light section line is extracted from the image of the light section line on the basis of the input luminance data (i.e., the coordinates of the image of the light section line are detected).

As shown in FIG. 11, the shape measuring system W includes a tire rotator 2, a sensor unit 3, a unit driving apparatus 4, an encoder 5, the light section line extracting apparatus X, and a host computer 7.

The tire rotator 2 is an apparatus, such as a motor, for rotating the tire 1 about the rotation axis 1g. Here, the tire 1 is an object having the shape to be measured. For example, the tire rotator 2 rotates the tire 1 at a rotation speed of 60 rpm. Thus, the shape measuring system W detects, using the sensor unit 3 described below, the shapes of a tread surface and a sidewall surface of an entire peripheral portion of the tire 1 within 1 second in which the tire 1 is rotated 360°.

The sensor unit 3 includes a light projection device 10 that emits a line of light to the surface of the rotating tire 1 and a camera 20 that captures an image of a light section line Ls (an image of the line of light) formed on the surface of the tire 1. In the present embodiment, the following three sensor units 3 are used: two sensor units 3a and 3c for measuring the shapes of two sidewalls of the tire 1 and a sensor unit 3b for measuring the shape of a tread surface of the tire 1.

The unit driving apparatus 4 movably supports each of the sensor units 3 by using a driving unit, such as a servo motor, as a driving source. The unit driving apparatus 4 determines the position of each of the sensor units 3 relative to the tire 1. Before the tire 1 is mounted and dismounted onto and from the tire rotator 2, the unit driving apparatus 4 places each of the sensor units 3 at a predetermined standby position separated from the tire 1 in response to a predetermined operation of an operation unit or a control command received from an external apparatus. After a new tire 1 is mounted onto the tire rotator 2, the unit driving apparatus 4 locates each of the sensor units 3 at a predetermined inspection position in the vicinity of the tire 1.

The encoder 5 is mounted on a rotation shaft of the tire rotator 2 so as to serve as a sensor that detects the rotation angle of the rotation shaft, that is, a change in the rotation angle of the tire 1 by a step of a predetermined unit angle. The encoder 5 then outputs a detection signal (a pulse signal) as a reset signal RESET (an example of the angle change detecting means). The detection signal (the reset signal RESET) output from the encoder 5 is used for controlling the timing of capturing an image of the cameras included in the sensor units 3 and the timing of transmitting data from the light section line extracting apparatus X to the host computer 7. Note that the encoder 5 is also an example of the rotation detecting means for detecting the rotation of the surface of the tire 1 by a predetermined unit angle and outputting a detection signal.

As shown in FIG. 12, the sensor unit 3 includes the light projection device 10 that emits line light (slit light) and the camera 20. In an example shown in FIG. 12, the surface to be measured corresponds to a sidewall surface of the tire 1.

As shown in FIG. 12, the light source 10 and the camera 20 are disposed so that an X-axis direction (a horizontal line direction) in the coordinate system of an image captured by the camera 20 is parallel to a moving direction R of the surface of the tire 1 moved by the rotation of the tire 1, and a Y-axis direction in the coordinate system of a captured image is parallel to a direction perpendicular to the moving direction R of the surface of the tire 1.

The direction in which the light projection device 10 outputs light (line light) is determined so that the image of a light section line Ls formed on the surface of the tire 1 extends in the Y-axis direction in the coordinate system of a captured image. This is the same in either case where the surface to be measured is a sidewall surface or the tread surface of the tire 1.

That is, when the sidewall surface of the tire 1 is measured, a direction that is perpendicular to the radial direction of the tire 1 (a direction normal to the rotation axis 1g of the tire 1) and the direction of the rotation axis 1g is parallel to the X-axis direction of the coordinate system. The radial direction of the tire 1 is parallel to the Y-axis direction of the coordinate system. The light section line Ls is formed so as to extend in the radial direction of the tire 1.

In contrast, when the tread surface of the tire 1 is measured, the direction of the rotation axis 1g is parallel to the Y-axis direction of the coordinate system. The tangential direction relative to the circumferential of the tire 1 is parallel to the X-axis direction of the coordinate system. The light section line Ls is formed so as to extend in the direction of the rotation axis 1g of the tire 1.

A relationship between the light section line extracting apparatus X and an apparatus that communicates signals with the light section line extracting apparatus X is described next with reference to FIG. 13.

As shown in FIG. 13, the light section line extracting apparatus X includes an image processing circuit 61, an SDRAM 62, and a parallel I/O interface 63 (represented as "PIO I/F" in FIG. 13).

The image processing circuit 61 is configured by using, for example, a field programmable gate array (FPGA) or an application specific integrated circuit (ASIC). The image processing circuit 61 primarily performs a light section line extracting process.

The SDRAM 62 is a high-speed memory that temporarily stores light section line data which is a result of a process performed by the image processing circuit 61. However, the SDRAM 62 may be replaced with another type of high-speed memory.

Each time the light section line data for one frame of the captured image is stored (recorded) in the SDRAM 62, the parallel I/O interface 63 transmits the light section line data to the host computer 7 at high speed using a parallel transfer method. The host computer 7 includes a parallel I/O interface 71 that performs parallel data transfer from and to the parallel I/O interface 63 of the light section line extracting apparatus X. The host computer 7 acquires the light section line data using the parallel I/O interface 71, and stores the light section line data into a main memory thereof.

Subsequently, the host computer 7 performs a shape measuring process using a light-section method on the basis of the acquired light section line data. For example, the host computer 7 computes the surface shape (the distribution of the height) of the tire 1 in the rotational direction. Thereafter, the host computer 7 instructs a display unit to display the shape or determines whether the shape satisfies a pre-defined pass criterion (or a fail criterion). Thus, the host computer 7 detects the presence/absence of a defect of the tire shape.

Note that if the luminance level of the acquired light section line data is below a predetermined level, the host computer 7 regards the data as data in an area where a light section line is not present.

The camera 20 includes an objective lens (not shown), a CMOS sensor 21 serving as an image sensor that captures an image formed by the objective lens, and an analog-to-digital (A/D) converter 22 (represented as an "ADC" in FIG. 13) that converts an analog signal representing the captured image data output from the CMOS sensor 21 into a digital signal.

The CMOS sensor 21 separates the pixels of a horizontal line (a line in the X-axis direction) of a captured image for one frame into pixel groups. The pixel group forms a pixel block. The CMOS sensor 21 outputs the luminance data of each of the pixel blocks in parallel in synchronization with a high-frequency clock signal CLK (e.g., 4000 Hz or more). Luminance data Dbk for each of the pixel blocks is transferred to the image processing circuit 61 of the light section line extracting apparatus X via the A/D converter 22. When outputting the luminance data Dbk, the CMOS sensor 21 outputs block number data BN that indicates the ordinal of the pixel block to which the luminance data Dbk belongs among the pixel blocks of the image for the frame simultaneously (at the same time as the luminance data Dbk is output). That is, the block number data BN indicates the position of each pixel block in the image for one frame. The block number data BN is transferred to the image processing circuit 61 of the light section line extracting apparatus X as well.

The clock signal CLK is supplied from a predetermined oscillating circuit 300 provided inside or outside the light section line extracting apparatus X.

In addition, the CMOS sensor 21 captures an image for one frame in synchronization with the detection signal (the reset signal RESET) of the encoder 5. For example, the CMOS sensor 21 captures an image for one frame every time the encoder 5 detects that the tire 1 that is rotating at 60 rpm rotates at 0.09° (=360°/4000). In this way, image capturing is performed at a rate of 4000 frames per second.

According to the present embodiment, the CMOS sensor 21 separates 256 pixels in a horizontal line of a captured image having a 320-by-256 resolution into 16 blocks (16 pixel groups). Thereafter, the CMOS sensor 21 outputs the luminance data about each of the blocks (16 luminance data items D00 to D0f) in parallel in synchronization with the 40-MHz clock signal CLK. Note that a frequency of 40 MHz for the clock signal CLK is sufficiently higher than a frequency of 20.5 MHz that is theoretically required for supporting an image capture rate of 4000 frames per second. In addition, if the resolution of the captured image is 256-by-256, a frequency of about 20 MHz of the clock signal CLK is sufficiently high.

Furthermore, each time the CMOS sensor 21 completes outputting the luminance data of the pixel groups for one horizontal line (one line in the X-axis direction), that is, each time the CMOS sensor 21 completes outputting the luminance data Dbk of the last pixel block of the pixel groups in the one horizontal line, the CMOS sensor 21 outputs a line end signal END-LINE. The clock signal CLK and the line end signal END-LINE are input to the image processing circuit 61 of the light section line extracting apparatus X.

Note that a charge coupled device (CCD) sensor may be used for the image sensor in place of the CMOS sensor 21.

The detection signal of a change in the rotation angle of the tire 1 detected by the encoder 5 serves as the reset signal RESET and is input to the image processing circuit 61 and the parallel I/O interface 63 of the light section line extracting apparatus X.

FIG. 15 is a schematic illustration of a correspondence relationship between an image of the tire 1 captured by the CMOS sensor 21 (a lower diagram in FIG. 15) and data (Xp, Yi, Kp) detected by the light section line extracting apparatus X (an upper diagram in FIG. 15). In the lower diagram of FIG. 15, for simplicity, the image of the light section line Ls in the captured image is represented by black color, and the background is represented by white color. However, in practice, the luminance of the image of the light section line Ls is high, and the luminance of the background is low.

The image processing circuit 61 sequentially receives the luminance data Dbk of the pixel blocks. Each time the input data becomes data for one horizontal line, the image processing circuit 61 detects a luminance data item having the highest luminance among the luminance data items of the pixels in the one horizontal line (the highest luminance data Kp in the line) and the coordinate information indicating the X coordinate (Xp) and the Y coordinate (Yp) of the position of the pixel corresponding to the highest luminance data Kp in the line. Thereafter, the image processing circuit 61 stores these pieces of information in the SDRAM 62 as extraction data of the light section line. However, according to the present embodiment, the Y coordinate Yi can be identified using the ordinal number of the data item Kp in the series of the highest luminance data Kp in the line. Accordingly, data that directly represents the Y coordinate Yi is not stored in the SDRAM 62.

An exemplary configuration of the image processing circuit 61 and an exemplary processing performed by the image processing circuit 61 are described next with reference to a block diagram shown in FIG. 14.

The image processing circuit 61 includes multi-stage circuits each performing simple data processing and storing the processing result in a register (hereinafter referred to as a "single-process circuit"). The single-process circuits perform processing thereof in parallel in synchronization with the clock signal CLK output from the oscillating circuit 300 (each time the pulse signal is input). The first-stage single-process circuit receives the luminance data Dbk of the pixel block from the CMOS sensor 21 and stores the input data in a predetermined register (e.g., a register of the single-process circuit in the subsequent stage) in synchronization with the clock signal CLK. Each of the single-process circuits subsequent to the second-stage single-process circuit performs data processing on the basis of the data stored by the single-process circuit in the immediately previous stage and stores the processing result in a register (e.g., a register of the single-process circuit in the immediately subsequent stage).

More specifically, a first-stage single-process circuit 610 simultaneously receives, from the CMOS sensor 21, the luminance data Dbk (D00 to D0f) for each of the pixel blocks and block number data BN of the pixel block and stores the input luminance data Dbk and the block number data BN in a predetermined input buffer in synchronization with the clock signal CLK. The first-stage single-process circuit 610 is an example of the information input means and an information input circuit. The block number data BN represents the position (the coordinates) of the pixel block corresponding to the input data in the captured image. In addition, since the storage position of each of the input luminance data items D00 to D0f (i.e., the address of the register) corresponds to the position (the ordinal number) of the pixel in the pixel block, the first-stage single-process circuit 610 stores, in the register, the coordinate information of the pixel in the pixel block together with the luminance data Dbk of the input pixel block.

In addition, the first-stage single-process circuit 610 initializes the luminance data D00 to D0f stored in the input buffer, that is, updates the luminance data D00 to D0f to the lowest luminance value "0" in synchronization with the reset signal RESET which is an angle change detection signal of the encoder 5.

As described above, the luminance data Dbk is luminance data of a pixel block which is one of pixel groups grouped from pixels in one horizontal line of an image captured by the CMOS sensor 21. In an example shown in FIG. 14, the luminance data of a pixel block including 16 pixels (i.e., 16 luminance data items D00 to D0*f*) are input in parallel. Note that, in the first-stage single-process circuit 610, initialization of the luminance data in synchronization with the reset signal RESET is not always necessary.

Second-stage to fifth-stage single-process circuits 611*a* to 611*d* are disposed downstream of the first-stage single-process circuit 610 for data input in a multi-stage fashion (four stages in this example). Each of the single-process circuits 611*a* to 611*d* (four in this example) compares every two neighboring luminance data items of all of the luminance data items stored by the immediately previous single-process circuit with each other and stores the luminance data item having a higher luminance and the coordinate information about the pixel in a predetermined register (a register of the immediately subsequent single-process circuit) in synchronization with the clock signal CLK (an example of the first luminance comparing means and a first luminance comparing circuit).

That is, the second-stage single-process circuit 611*a* compares every neighboring two of the luminance data items D00 to D0*f* stored by the first-stage single-process circuit 610 in synchronization with the clock signal CLK and stores luminance data items D10 to D17 having a higher luminance and the coordinate information BN and C10 to C17 indicating the positions (the coordinates) of the pixels corresponding to the luminance data items D10 to D17 in a register of the immediately subsequent single-process circuit. Here, the coordinate information includes the block number data BN and intra-block pixel number data C10 to C17 indicating the positions (the ordinal numbers) of the pixels in the pixel block that are determined to have a higher luminance among every two neighboring pixels.

The third-stage single-process circuit 611*b* compares every neighboring two of the luminance data items D10 to D17 stored by the second-stage single-process circuit 611*a* in synchronization with the clock signal CLK and stores luminance data items D20 to D23 having a higher luminance and the coordinate information BN and C20 to C23 indicating the positions (the coordinates) of the pixels corresponding to the luminance data items D20 to D23 in a register of the single-process circuit immediately downstream thereof. Here, the coordinate information includes the block number data BN and intra-block pixel number data C20 to C23 indicating the positions (the ordinal numbers) of the pixels in the pixel block that are determined to have a higher luminance among every two neighboring pixels.

The fourth-stage single-process circuit 611*c* and the fifth-stage single-process circuit 611*d* perform processing similar to that of the third-stage single-process circuit 611*b* in synchronization with the clock signal CLK.

In this way, the fifth-stage single-process circuit 611*d*, which is the last single-process circuit among the second-stage single-process circuit 611*a* to the fifth-stage single-process circuit 611*d*, stores, in a register (a register of a sixth-stage single-process circuit 612*a*), luminance data D40 having the highest luminance among the luminance data items D00 to D0*f* and the coordinate information BN and C40 of the pixel block.

That is, when the pixel block includes 2N pixels (where N is an integer greater than or equal to 2), the image processing circuit 61 includes N multi-stage single-process circuits respectively corresponding to the second-stage single-process circuit 611*a* to the fifth-stage single-process circuit 611*d*.

Note that the first-stage single-process circuit 610 performs only light-load processing (processing without an arithmetic operation) such as reception of luminance data items D00 to D0*f* of the pixel block. Accordingly, the processing of the first-stage single-process circuit 610 and the processing of the second-stage single-process circuit 611*a* may be performed within one cycle of the clock signal CLK.

A sixth-and-seventh single-process circuit 612 includes the sixth-stage single-process circuit 612*a* and a seventh-stage single-process circuit 612*b*. The sixth-and-seventh single-process circuit 612 compares the luminance data D40 stored by the fifth-stage single-process circuit 611*d* (corresponding to the first luminance comparing means in the last stage) that holds the highest luminance data among the luminance data items D00 to D0*f* of the pixel block with luminance data D50' previously stored in the register by the sixth-and-seventh single-process circuit 612. Thereafter, the sixth-and-seventh single-process circuit 612 stores luminance data D50 having a higher luminance and coordinate information ADDR about the pixel in a predetermined register (a register of the seventh-stage single-process circuit 612*b* and an output register 61*y*) in synchronization with the clock signal CLK (an example of the second luminance comparing means and the second luminance comparing circuit).

More specifically, in synchronization with the clock signal CLK, the sixth-stage single-process circuit 612*a* compares the luminance data D40 stored by the fifth-stage single-process circuit 611*d* with the luminance data D50' previously stored in the register of the seventh-stage single-process circuit 612*b* by the sixth-stage single-process circuit 612*a*. Thereafter, the sixth-stage single-process circuit 612*a* stores the luminance data D50 having a higher luminance and the coordinate information ADDR about the pixel in the register of the seventh-stage single-process circuit 612*b*. Here, the coordinate information ADDR includes the block number data BN and the intra-block pixel number data C40. If the luminance data D40 stored by the fifth-stage single-process circuit 611*d* is higher than the luminance data D50', the sixth-stage single-process circuit 612*a* stores, in the register, the coordinate information ADDR including the block number data BN and the intra-block pixel number data C40 stored by the fifth-stage single-process circuit 611*d*. Otherwise, the sixth-stage single-process circuit 612*a* maintains the coordinate information ADDR stored in the register of the seventh-stage single-process circuit 612*b* without any change (the same information may be written to the register).

In addition, in synchronization with the clock signal CLK, the seventh-stage single-process circuit 612*b* converts the luminance data D50 stored by the sixth-stage single-process circuit 612*a* and the coordinate information ADDR about the pixel into a predetermined data format (e.g., the seventh-stage single-process circuit 612*b* appends meaningless data so that the data length is changed to a predetermined length) and stores the data in the output register 61*y*.

Furthermore, in synchronization with a horizontal synchronization signal $H_{sync}$ described below, the seventh-stage single-process circuit 612*b* initializes the luminance data D50 and the coordinate information ADDR of the pixel previously stored in the register of the seventh-stage single-process circuit 612*b* (the information stored by the sixth-and-seventh single-process circuit 612), that is, the seventh-stage single-process circuit 612*b* updates the luminance data D50 to the lowest luminance value "0" (an example of the luminance initializing means and the luminance initializing circuit).

The second to seventh single-process circuits 611a to 611d, 612a, and 612b initialize the luminance data D10 to D17, D20 to D23, D30, D31, D40, and D50, that is, update the data to the lowest luminance value "0" in synchronization with the reset signal RESET which is an angle change detection signal of the encoder 5.

Note that each of the second to seventh single-process circuits 611a to 611d, 612a, and 612b is an example of the luminance initializing means and the luminance initializing circuit.

Through the processing performed by the first to seventh single-process circuits 610, 611a to 611d, 612a, and 612b, for all of the pixel blocks input after the first to seventh single-process circuits 610, 611a to 611d, 612a, and 612b enter the initialization state (a state in which the data are initialized), the luminance data D50 of a pixel having the highest luminance and the coordinate information ADDR about the pixel can be stored in the output register 61y.

In the example circuit shown in FIG. 14, steps (time) for 6 clocks of the clock signal CLK are required from when the first-stage single-process circuit 610 of the image processing circuit 61 receives the luminance data items D00 to D0f of the last pixel block of the pixel groups for one horizontal line of a captured image, that is, when the line end signal END-LINE is input to when the processing for storing, in the output register 61y, luminance data Dmax of a pixel having the highest luminance among the pixels of all of the pixel groups in the one horizontal line and the coordinate information Amax about the pixel (i.e., the processing performed by the sixth-stage single-process circuit 612a) is started. Accordingly, a signal delayed (shifted) from the line end signal END-LINE by 6 clocks of the clock signal CLK serves as a signal indicating a timing at which the sixth-and-seventh single-process circuit 612 stores, in the output register 61y, the luminance data of a pixel having the highest luminance among the pixels of each of the pixel groups of one horizontal line of the captured image (i.e., a storing operation is completed). That is, the delayed signal serves as the horizontal synchronization signal $H_{sync}$ when the data stored in the output register 61y is used as reference data.

Therefore, the image processing circuit 61 further includes a delay circuit 614 that generates the horizontal synchronization signal $H_{sync}$ by delaying (shifting) the line end signal END-LINE by 6 clocks of the clock signal CLK (an example of the horizontal synchronization signal generating means and the horizontal synchronization signal generating circuit).

When, as described above, the processing of the first-stage single-process circuit 610 and the processing of the second-stage single-process circuit 611a are performed within one cycle of the clock signal CLK, the delay circuit 614 can delays (shifts) the line end signal END-LINE by 5 clocks of the clock signal CLK.

As noted above, through the processing performed by the first-stage to seventh-stage single-process circuits 610, 611a to 611d, 612a, and 612b, for all of the pixel blocks input after the first-stage to seventh-stage single-process circuits 610, 611a to 611d, 612a, and 612b enter the initialization state (a state in which the data are initialized), the luminance data D50 of a pixel having the highest luminance and the coordinate information ADDR about the pixel can be stored in the output register 61y.

In addition, the seventh-stage single-process circuit 612b initializes the luminance data D50 and the coordinate information ADDR about the pixel previously stored in the register of the seventh-stage single-process circuit 612b (i.e., the seventh-stage single-process circuit 612b updates the luminance data D50 to the lowest luminance value "0") in synchronization with the horizontal synchronization signal $H_{sync}$. Accordingly, when the horizontal synchronization signal $H_{sync}$ is generated, the luminance data about a pixel having the highest luminance among the pixels of the pixel groups of one horizontal line and the coordinate information about the pixel are stored (recorded) in the output register 61y.

The image processing circuit 61 further includes a gate circuit 613 serving as an eighth-stage single-process circuit that writes the data stored in the output register 61y to the SDRAM 62 in synchronization with the horizontal synchronization signal $H_{sync}$.

The gate circuit 613 writes the luminance data D50 and the coordinate information ADDR about the pixel stored in the output register 61y to a storage area of the SDRAM 62 (an example of the light section line information storing means) while sequentially changing the position of the storage area (i.e., the gate circuit 613 sequentially appends data to the SDRAM 62) in synchronization with the horizontal synchronization signal $H_{sync}$. The gate circuit 613 is an example of the information recording means and the information recording circuit.

Through the above-described processing performed by the image processing circuit 61, data of a light section line in one frame of the captured image is accumulated (recorded) during a time when the reset signal RESET serving as an angle change detection signal of the encoder 5 is generated to a time when the next reset signal RESET is generated. Here, the data of a light section line includes the luminance data D50 representing the luminance value Kp of the pixel having the highest luminance for each of the horizontal lines (for each position Yi in the Y-axis direction) and the coordinate information ADDR indicating the coordinate Xp of the pixel.

Subsequently, the parallel I/O interface 63 parallel transfers the data (the data of the light section line) written to the SDRAM 62 by the gate circuit 613 to the external host computer 7 at high speed in synchronization with the reset signal RESET serving as the angle change detection signal of the encoder 5, that is, each time the data of the light section line in one frame of the captured image is stored (recorded) in the SDRAM 62. The parallel I/O interface 63 is an example of the information transfer means and the information transfer circuit.

As described above, after all the information (the luminance information) for one frame of the captured image is acquired, the light section line extracting apparatus X does not perform a light section line extraction process on the basis of the acquired information. Instead, in synchronization with the high-frequency clock signal CLK, the light section line extracting apparatus X receives the luminance data Dbk for each of the pixel blocks, which is part of the captured image, in parallel. Subsequently, the light section line extracting apparatus X extracts the data of the highest luminance from among the luminance data Dbk using the single-process circuits. The light section line extracting apparatus X separates the extraction process into a plurality of small processes that requires low computing load and executes the small processes using the single-process circuits through a plurality of stages. Thereafter, the light section line extracting apparatus X stores, in the SDRAM 62, the light section line data (the highest luminance data in each of the horizontal lines and the coordinates of the pixel) extracted from one frame of the captured image.

In this way, the light section line extracting apparatus X can perform the light section line extraction process in real time for the image capture rate of the CMOS sensor 21, although a slight delay occurs for the one-frame image capturing completion timing of the CMOS sensor 21. In addition, since the computing load of the process to be performed in synchronization with the clock signal CLK (each of the processes in the single-process circuit) can be reduced, the light section line extracting apparatus X according to the present invention can be achieved using a practical device (a circuit), such as an ASIC or an FPGA.

Furthermore, the light section line extracting apparatus X receives the luminance data of each of a relatively small number of pixel groups (pixel blocks), compares every two of the data items with each other, and holds (stores in a register) the data item having a higher luminance. Accordingly, only a small capacity memory (register) is required, and therefore, the light section line extracting apparatus X having a simple unit (circuit) configuration can be achieved.

Still furthermore, even when a large number of luminance data items are input per unit of time due to a captured image having high resolution, the light section line extracting apparatus X can perform a light section line extraction process for images continuously captured in real time, although a delay occurs in the completion timing of capturing a one-frame image.

Light section line data are recorded in the SDRAM 62 substantially at the image capture rate of the CMOS sensor 21 (e.g., 4000 frame/sec) and are transferred to the host computer 7. When a practical computer (e.g., a personal computer) is used for the host computer 7, about 1/4000 second is sufficient for the host computer 7 to perform the following operation. The host computer 7 receives the light section line data via the parallel I/O interface 71. Thereafter, the host computer 7 measures the shape of the tire surface (the distribution of the height) in the rotation direction of the tire and makes a decision to pass or fail the tire on the basis of the received light section line data.

Accordingly, in a tire shape defect inspection step, by using the light section line extracting apparatus X, the shape of the tire can be examined in real time even when a time required for an image capturing sub-step of the tire 1 is reduced (e.g., 1 second).

As described above, the light section line extracting apparatus X acquires the line end signal END-LINE from the CMOS sensor 21 and generates the horizontal synchronization signal $H_{sync}$ on the basis of the line end signal END-LINE. However, the horizontal synchronization signal $H_{sync}$ may be generated using a different method.

For example, the following counter circuit may be provided in the image processing circuit 61. The counter circuit starts counting the number of inputs of the clock signal CLK when the reset signal RESET is input. If the count number reaches a predetermined value, the counter circuit generates the horizontal synchronization signal $H_{sync}$.

Similarly, a circuit for generating the block number data BN may be provided in the image processing circuit 61. For example, that circuit initializes the block number data BN each time the reset signal RESET is input. Thereafter, the circuit counts the number of inputs of the clock signal CLK. Every time the count number reaches a predetermined value, the circuit increments the value of the block number data BN by one so as to generate the block number data BN.

Furthermore, in the image processing circuit 61 shown in FIG. 14, the gate circuit 613 may function as a circuit for writing data stored in the register of the seventh-stage single-process circuit 612b to the SDRAM 62. Thus, the need for the output register 61y and the process for storing data in the output register 61y can be eliminated. However, in such a case, the number of clocks for delay of the line end signal END-LINE determined by the delay circuit 614 is 5.

While foregoing embodiments have been described with reference to the configuration in which the tire surface is scanned by moving the tire 1 with the sensor units 3 being stationary, the configuration is not limited thereto. For example, the tire surface may be scanned by moving the sensor unit 3 along the tire surface (linearly or rotationally) with the tire being stationary.

(3)

Although the present invention has been described in detail in terms of the presently preferred embodiment, it is to be understood that various alternations and modifications will no doubt become apparent to those skilled in the art within the true spirit and scope of the invention. For example, the shape measuring system for a tire described in the above-described section (1) may include the light section line extracting apparatus described in section (2). A shape measuring system for a tire having such a configuration can extract a clear image of a light section line emitted onto a tire at high speed even when the image of the light section line is captured at a high image capture rate (e.g., 4000 or more frames per second).

What is claimed is:

1. A tire shape measuring system for capturing an image of a line of light emitted to a surface of a relatively rotating tire and measuring the shape of the tire surface by detecting the shape using a light-section method on the basis of the captured image, comprising:

line light emitting means for forming a plurality of separate light section lines on the tire surface by emitting a plurality of lines of light in a direction different from a direction in which the height of the tire surface is detected, each of the light section lines extending in a second direction perpendicular to a first direction representing a moving direction of the tire surface, areas occupied by the light section lines being shifted with respect to each other in the second direction;

image capturing means for capturing images of the separate light section lines formed on the tire surface in directions in which chief rays of the line light rays are specularly reflected by the tire surface;

light section line coordinate detecting means for individually detecting the coordinates of the light section lines representing the coordinates of the images of the light section lines from images of independent image processing target areas pre-defined for the separate light section lines in a coordinate system of a captured image captured by the image capturing means for each of a plurality of captured images captured by the image capturing means in accordance with a predetermined amount of rotational movement; and surface shape calculating means for calculating a distribution of the surface height of the tire in the first direction on the basis of the plurality of coordinates of the light section lines detected by the light section line coordinate detecting means.

2. The tire shape measuring system according to claim 1, further comprising:

a plurality of sets of the line light emitting means and the image capturing means, each of the sets emitting the lines of light and capturing the image of the light section lines for one of a plurality of surfaces of the tire at the same time.

3. The tire shape measuring system according to claim 2, wherein the plurality of the line light emitting means corresponding to the plurality of surfaces of the tire emit the lines of light having different wavelengths.

4. The tire shape measuring system according to claim 1, further comprising:

collimating means for collimating each of the lines of light emitted to the tire surfaces by the line light emitting means.

5. The tire shape measuring system according to claim 1, further comprising:
light converging means for converging each of the lines of light emitted to the tire surfaces by the line light emitting means in a light line length direction.

6. The tire shape measuring system according to claim 1, wherein the line light emitting means forms the plurality of separate light section lines each extending in the second direction on the tire surface so that an end of any one of the separate light section lines overlaps with an end of the neighboring light section line in the second direction.

7. The tire shape measuring system according to claim 1, wherein the light section line coordinate detecting means detects the coordinates of the light section line by detecting the coordinate of a pixel having the highest luminance on a line-to-line basis in the first direction for each of the images of the independent image processing target areas.

8. The tire shape measuring system according to claim 1, further comprising:
automatic image processing target area setting means for automatically setting the coordinates of the independent image processing target areas by detecting a position of a pixel having a luminance higher than or equal to a predetermined level in at least one of predetermined areas of the image captured by the image capturing means and shifting the coordinates of a plurality of predefined independent reference areas in accordance with the detected position of the pixel.

9. The tire shape measuring system according to claim 1, wherein the surface shape calculating means calculates distributions of the surface heights of an object to be measured in the first and second directions on the basis of the plurality of coordinates of the light section lines detected by the light section line coordinate detecting means and predetermined setting shift information about shift amounts of the movement corresponding to positional shifts among the separate light section lines in the first direction.

10. The tire shape measuring system according to claim 1, wherein the line light emitting means includes first line light emitting means for forming, on a sidewall surface of the tire, the plurality of separate light section lines each extending in the second direction substantially parallel to a radial direction of the tire, and wherein the image capturing means includes first image capturing means for capturing images of the plurality of separate light section lines formed on the sidewall surface of the tire by the first line light emitting means.

11. The tire shape measuring system according to claim 1, wherein the line light emitting means includes second line light emitting means for forming, on a tread surface of the tire, the plurality of separate light section lines each extending in the second direction substantially parallel to a direction perpendicular to the circumferential direction of the tire, and wherein the image capturing means includes second image capturing means for capturing images of the plurality of separate light section lines formed on the tread surface of the tire by the second line light emitting means.

12. A tire shape measuring system for capturing an image of a line of light emitted to a surface of a relatively rotating tire and measuring the shape of the tire surface by detecting the shape using a light-section method on the basis of the captured image, comprising:
line light emitting means for emitting a plurality of continuous lines of light in a direction different from a direction in which the height of the tire surface is detected so as to form one light section line on the tire surface;
image capturing means for capturing images of the lines of light emitted to the tire surface in directions in which chief rays of the lines of light are specularly reflected by the tire surface; and
a light section line extracting apparatus for receiving luminance information about pixels of an image captured by an image sensor of the image capturing means that captures a two-dimensional image including an image of light section line formed on the tire surface and extracting the image of the light section line on the basis of the received luminance information, the light section line extracting apparatus including information input means, a plurality of first luminance comparing means disposed downstream of the information input means in a multistage fashion, second luminance comparing means, horizontal synchronization signal generating means, information recording means, and luminance initializing means, the information input means receiving luminance information about a pixel block that is one of pixel groups formed by separating pixels in one horizontal line of the image captured by the image sensor into the pixel groups in parallel and storing, in predetermined storage means, the luminance information about the received pixel block and coordinate information about the pixels in the pixel block in synchronization with a clock signal of a predetermined frequency, the first luminance comparing means comparing every neighboring two of all pieces of the luminance information stored by the first luminance comparing means in the immediately preceding stage with each other and storing the piece of the luminance information having the higher luminance and the coordinate information about the pixel in a predetermined storage means in synchronization with the clock signal, the second luminance comparing means comparing luminance information stored by the first luminance comparing means in the last stage that stores the pieces of the luminance information having the highest luminance among the pieces of the luminance information of the pixel block with the previously stored luminance information as a result of previous processing and storing the piece of the luminance information having the higher luminance and the coordinate information about the pixel in a predetermined storage means in synchronization with the clock signal, the horizontal synchronization signal generating means generating a horizontal synchronization signal representing a timing of the luminance information about a pixel having the highest luminance in each of the pixel groups of one horizontal line of the captured image being stored in predetermined storage means by the second luminance comparing means, the information recording means sequentially writing, in an append mode, the luminance information and the coordinate information about the pixel stored by the second luminance comparing means to predetermined light section line information storage means in synchronization with the horizontal synchronization signal, the luminance initializing means initializing the luminance information stored by the second luminance comparing means in synchronization with the horizontal synchronization signal.

13. The tire shape measuring system according to claim 12, further comprising:
information transfer means for transferring the information written to the predetermined light section line information storage means by the information recording means to the outside in synchronization with a detection signal output from rotation detecting means for detecting a predetermined amount of rotation.

14. The tire shape measuring system according to claim 12, wherein the image sensor is a CMOS sensor.

* * * * *